US011914622B2

(12) United States Patent
Iserson et al.

(10) Patent No.: US 11,914,622 B2
(45) Date of Patent: Feb. 27, 2024

(54) EFFICIENT FACTOR ANALYSIS ON LARGE DATASETS USING CATEGORICAL VARIABLES

(71) Applicant: SAP SE, Walldorf (DE)

(72) Inventors: Nikita Iserson, Sankt-Leon Rot (DE);
Sawinder Kaur, Bangalore (IN);
Yogeshwaran Kandasamy, Puducherry (IN); Balaji Elumalai, Bangalore (IN);
Ashish Tripathy, Bangalore (IN);
Karl-Peter Nos, Nussloch (DE)

(73) Assignee: SAP SE, Walldorf (DE)

( * ) Notice: Subject to any disclaimer, the term of this patent is extended or adjusted under 35 U.S.C. 154(b) by 197 days.

(21) Appl. No.: 16/884,454

(22) Filed: May 27, 2020

(65) Prior Publication Data
US 2021/0319045 A1    Oct. 14, 2021

(30) Foreign Application Priority Data
Apr. 9, 2020    (IN) .............................. 202011015547

(51) Int. Cl.
*G06F 16/00* (2019.01)
*G06F 16/22* (2019.01)
*G06F 16/2455* (2019.01)
*G06F 16/28* (2019.01)
*G06N 20/00* (2019.01)

(52) U.S. Cl.
CPC .......... *G06F 16/285* (2019.01); *G06F 16/221* (2019.01); *G06F 16/2456* (2019.01); *G06N 20/00* (2019.01)

(58) Field of Classification Search
CPC .. G06F 16/285; G06F 16/221; G06F 16/2456; G06F 17/18; G06N 20/00

USPC .................................................. 707/600–899
See application file for complete search history.

(56) References Cited

U.S. PATENT DOCUMENTS

| | | | |
|---|---|---|---|
| 10,306,013 B2 | 5/2019 | Bracher et al. | |
| 2003/0018451 A1* | 1/2003 | Sullivan | G06F 11/008 702/182 |
| 2010/0057645 A1* | 3/2010 | Lauritsen | G06N 5/042 706/11 |

(Continued)

OTHER PUBLICATIONS

Brownlee, Jason, "How to Perform Feature Selection with Categorical Data", Nov. 25, 2019, Data Preparation (Year: 2019).*
Brownlee, "How to Perform Feature Selection with Categorical Data", Python Machine Learning, https://machinelearningmastery.com/feature-selection-with-categorical-data/, 28 pages (Nov. 2019).

(Continued)

*Primary Examiner* — Michelle N Owyang
*Assistant Examiner* — Shirley D Hicks
(74) *Attorney, Agent, or Firm* — Klarquist Sparkman, LLP

(57) ABSTRACT

Methods and apparatus are disclosed for efficient factor analysis of a large population of data records, using factors that are categorical variables. Computation is balanced between extracting key factors by training a machine learning classifier on a reduced sample of data records, for computational efficiency, and scoring the categorical values of the key factors on the entire population, for accuracy of results. A joint factor is constructed by combining all proposed root factors, and the sample is generated by stratified sampling on the joint factor. The key factors are selected from candidate factors which can be combinations of the root factors. Original variables of a dataset, whether categorical or not, can be binned to obtain new categorical factors. Variations and user interfaces are also disclosed.

19 Claims, 12 Drawing Sheets

(56) References Cited

U.S. PATENT DOCUMENTS

| | | |
|---|---|---|
| 2010/0088351 A1 | 4/2010 | Dehmann et al. |
| 2012/0059702 A1* | 3/2012 | Yoder .................... G06Q 30/02 705/14.49 |
| 2012/0066062 A1* | 3/2012 | Yoder ................ G06Q 30/0253 705/14.51 |
| 2014/0019206 A1 | 1/2014 | Kraus et al. |
| 2014/0156649 A1 | 6/2014 | Bhattacharjee |
| 2014/0200958 A1 | 7/2014 | Wagenblatt |
| 2014/0244197 A1 | 8/2014 | Boudreau |
| 2015/0026105 A1* | 1/2015 | Henrichsen ........ G06Q 30/0251 706/12 |
| 2015/0356085 A1 | 12/2015 | Panda et al. |
| 2019/0050723 A1* | 2/2019 | Kong .................... G06K 9/6256 |
| 2020/0103886 A1* | 4/2020 | Gandenberger ... G05B 23/0283 |
| 2021/0090694 A1* | 3/2021 | Colley .................. G16B 40/00 |
| 2021/0327540 A1* | 10/2021 | Schobel ................ G16H 50/30 |

OTHER PUBLICATIONS

Molnar, "Interpretable Machine Learning, A Guide for Making Black Box Models Explainable", https://christophm.github.io/interpretable-ml-book/feature-importance.html, 13 pages excerpt (Mar. 2020).

Narkhede, "Understanding AUC—ROC Curve", https://towardsdatascience.com/understanding-auc-roc-curve-68b2303cc9c5, 7 pages (Jun. 2018).

"SAP Big Data Margin Assurance—Feature Scope Description", https://help.sap.com/BDMA_FeatureScopeDescription/BDMAFSD.pdf, pp. 1-10 (Nov. 2017).

"SAP Customer Profitability Analytics What's New on Premise Edition", https://help.sap.com/doc/ddcb4bb541aa43ce85507903fa60a771/2.5.0/en-US/loioe8c2d16f09fc4ddb90dc560e6af5ad4a.pdf, pp. 1-8 (Oct. 2019).

Sun et al., "AVC: Selecting discriminative features on basis of AUC by maximizing variable complementarity", BMC Bioinformatics 2017, 18(Suppl. 3):50, pp. 73-89 (Jan. 2017).

* cited by examiner

EFFICIENT FACTOR ANALYSIS ON LARGE DATASETS USING CATEGORICAL VARIABLES

CROSS REFERENCE TO RELATED APPLICATION

This application claims priority to India Patent Application Number 202011015547, filed Apr. 9, 2020, titled "EFFICIENT FACTOR ANALYSIS ON LARGE DATASETS USING CATEGORICAL VARIABLES," which application is hereby incorporated by reference in its entirety.

BACKGROUND

Factor analysis is of great interest in data mining, as a tool to improve outcomes by understanding leading contributory factors for various outcomes or events. However, as dataset sizes continue to grow rapidly, conventional techniques struggle to provide adequate performance. Computation with large numbers of records or candidate factors can be prohibitive. Extracting representative samples from a large dataset can be challenging when a large number of factors are present. Accordingly, there remains a need for improved technologies for factor analysis on large datasets.

SUMMARY

In summary, the detailed description is directed to various innovative technologies for performing factor analysis using categorical variables. In examples, given a set of candidate factors and a population of data records, various combinations of the candidate factors can be aggregated into a joint variable. Stratified sampling on the joint variable can produce a sample of data records mimicking the distribution of the population for each of the candidate factors. Feature importance scores can be evaluated on the sample of data records to identify key factors. The key factors and their associated values can be evaluated using the population of data records, and top-scoring factor values can be returned to a requesting client.

In certain examples, the disclosed technologies can be implemented as a method in a computer system that implements a factor analysis tool. A request is received from a client. Responsive to the request, a sample of records is analyzed to identify key factors for a target metric. The sample of records is part of a population of records. The key factors are evaluated for the population of records, and one or more of the evaluations are transmitted to the client.

In some examples, the request can identify root factors, and a set of candidate factors can be generated from the root factors. The key factors can be selected from among the set of candidate factors. The generating can include initializing the set of candidate factors and performing iterations over multiple tuple sizes. At each iteration, a plurality of tuples of the root factors can be generated, each generated tuple having the instant tuple size. The generated tuples can be added to the set of candidate factors. The generated tuples can include all combinations of the root factors having the instant tuple size.

In additional examples, the population of records can include at least a million records. The request can identify root factors, which can be combined to form a joint factor, which can be evaluated for the population of records. The root factors can be categorical variables. The sample of records can be generated by stratified sampling of the population of records according to the values of the joint factor. The population of records can be stored in a database, and a column for the joint factor can be added to the database. For each record of the population, the value of the joint factor can be evaluated and stored in the added column. The sample generation can include initializing the sample of records, and iterating over values of the joint factor. At each iteration, the number of population records having the instant joint factor value can be counted. A target number of sample records can be determined. In cases where the target number is greater than zero, this number of records (with the instant joint factor value) can be extracted from the population of records. The extracted records can be added to the sample of records. In some examples, the sample generation can also include obtaining a target size of the sample of records. Then, for at least a given value of the joint factor, the target number of sample records can be determined by first making a preliminary determination of a number of records, and adjusting the preliminary determination to determine the target number of records. Thereby, the generated sample of records can have the target size.

In further examples, each sample record can include factor values for respective candidate factors and a label value for the target metric. Analyzing the sample records can include training a classification machine learning tool on the sample of records, with the factor values being training inputs and the label value being a training output. The trained classification machine learning tool can be used to evaluate respective feature importances of a plurality of the candidate factors. The key factors can be identified based on these feature importances. In some examples, if the feature importance of a given candidate factor is greater than or equal to a predetermined threshold, then the given candidate factor can be identified as one of the key factors. In varying examples, the feature importance of a particular candidate factor can be evaluated based on an area under a curve (AUC), a chi-square evaluation, or random permutation of the particular candidate factor.

In additional examples, evaluating the key factors can include determining distinct scores for respective values of each key factor. The target metric can be binary-valued, and the distinct scores can include a score for a given value of a given key factor, the score being determined as proportional to a harmonic mean of an F-beta score for the given value and a feature importance for the given factor. One or more highest scores can be selected from the distinct scores for respective values of the key factors. The evaluations transmitted to the client can include the values and key factors corresponding to the selected scores.

In certain examples, the disclosed technologies can be implemented as computer-readable media storing instructions which, when executed by one or more hardware processors, cause the hardware processors to perform the following actions related to handling a factor analysis request. In conjunction with the factor analysis request, a sample of records from a population is analyzed to identify key factors for a target metric. The key factors are evaluated for the population of records, and one or more of the evaluations are outputted in response to the request.

In some examples, the actions can include generating a set of candidate factors from root factors by initializing the set of candidate factors and iterating over a plurality of tuple sizes. At each iteration, multiple tuples of the root factors can be generated having the instant tuple size. The generated tuples can be added to the set of candidate factors. The sample of records from the population of records can be extracted by combining the root factors into a joint factor, evaluating values of the joint factor for each record of the population, and generating the sample of records by stratified sampling of the population of records according to the values of the joint factor.

In further examples, each sample record can include categorical factor values for respective candidate factors and a label value for the target metric. The analyzing action can include training a classification machine learning tool on the sample of records, with the factor values being training inputs and the label value being a training output, and using the trained classification machine learning tool to evaluate respective feature importances of multiple candidate factors. The key factors can be identified from the set of candidate factors based on the feature importances. The evaluating action can include evaluating respective scores for each factor value of the key factors, and selecting one or more of the factor values having highest score(s) among the respective scores. The outputted evaluation(s) can include comprise the selected factor value(s).

In certain examples, the disclosed technologies can be implemented as a system having one or more hardware processors, with memory coupled thereto, and computer-readable media storing executable instructions for responding to a request by performing the following operations. First instructions cause an identifier of a target metric and root factors to be obtained for a population of records. Second instructions cause a set of candidate factors to be generated from the root factors. Third instructions cause a sample of records to be extracted from the population of records, based on the root factors. Fourth instructions cause the sample of records to be analyzed to identify key factors, among the set of candidate factors, for the target metric. Fifth instructions cause evaluation of values of the key factors, for the population of records. Sixth instructions cause one or more of the evaluations to be output as a response to the request.

The foregoing and other objects, features, and advantages of the disclosed technologies will become more apparent from the following detailed description, which proceeds with reference to the accompanying figures.

DETAILED DESCRIPTION

Introduction

Figures 1A, 1B:
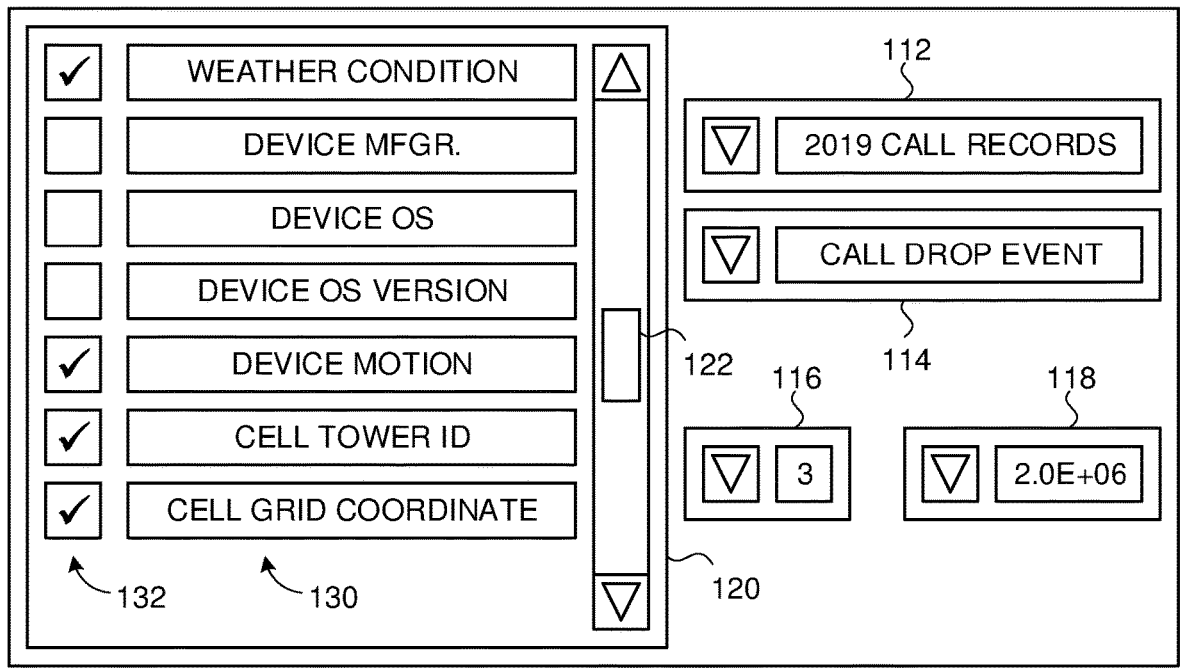
FIGS. 1A-1B illustrate user interface screens for an example use case of the disclosed technologies.

As ever larger datasets are amassed around the world, a common interest for data mining is to understand associations and causal relationships between observable quantities. For example, a telecom provider may seek to understand a root cause behind dropped calls, an epidemiologist may seek to understand patterns of infection spread, or a software developer for a self-driving automobile may seek to simplify a machine learning (ML) model associated with predicting behavior of nearby vehicles. In these applications, a common goal is to identify patterns relating factors, or combinations of individual factors, with target events or outcomes. Also common is the availability of vast datasets, with millions or even billions of records, and dozens, hundreds, or even more candidate factors that could be associated with the events or outcomes of interest.

In the telecom root cause analysis, a population of detailed call records can provide a corpus for analysis, with factors including device parameters (e.g. software version, manufacturer, wireless chipset, or power control mechanism), infrastructure parameters (e.g. which base station(s) dropped a call, software version, priority policies in effect, congestion at the base station, or congestion in the transmission band), environmental or event-specific parameters (e.g. weather conditions such as rain, wireless reflections or antenna shadows in the device vicinity, device movement at the time of a dropped call, or signal-to-noise ratio), or many other parameters. Many of these variables are categorical variables, and others can be binned into categories to facilitate analysis, at least initially. Other root cause analysis problems are similar, whether in the field of manufacturing (e.g. statistical process control), software failure analysis (e.g. from dump files), or in healthcare (e.g. errors in medical treatment).

In the epidemiological analysis, detailed location and contact tracing of affected individuals can include many records with fields indicating times at which an individual was at a particular location, locations where the individual was at particular times, or whether or not the individual attended a particular event. In the self-driving machine learning example, candidate factors can include signals from assorted sensors (e.g. cameras, lidar, or microphones), derived properties from such signals (e.g. distance to other vehicle, relative position of other vehicle, relative speed of other vehicle, type of other vehicle, number of other vehicles in the vicinity, pedestrians or animals nearby, or motion thereof), as well as vehicle logs (e.g. speed, location, turn signals, braking, defective signals, or self-driving or manual mode of operation), and so forth. In other factor analyses, there can be hundreds or thousands of demographic niches, product features, or service attributes from which leading factors can emerge.

Numerous challenges face the person of ordinary skill trying to deal with such problems. The computational resources required to process an entire population of available records can be prohibitive. Even where a tool may be available, the effort of preprocessing or transforming a population of records to conform with the tool can negate any benefits of using the tool, and can require expert knowledge of the tool. Extracting a sample from a population can risk losing many potentially interesting records. Then, the analysis of a sample can give inaccurate estimates of the predictive value of particular factors or factor values.

Additionally, computation issues can lead to significant performance degradation as number of factors increases. For example, with five individual factors, the number of two-way combinations is 10, and the number of three-way combinations is also 10, so considering two-way and three-way combinations increases storage to 5× (from 5 to 10+10+5=25) the requirement for just the individual factors. Increasing the number of individual factors to six or seven, results in 41 or 63 combinations, counting singlets, pairs, and triplets. This can present a particular preprocessing and storage burden for adapting an existing dataset to a particular ML tool.

As described herein, the disclosed technologies provide a number of innovations to overcome or ameliorate these problems. In a first aspect, the disclosed technologies can implement a stratified sampling technique suitable for multidimensional inputs (e.g. multiple candidate factors), so as to provide a small sample of records that is representative of its parent population. The sample can be 0.1%-20% the size of the parent population, depending on the population size, the number of individual factors, and asymmetries in the distribution of the corresponding factor values. Thus, compute intensive tasks, such as training an ML model, or evaluating feature importance of various candidate factors, can be performed with greatly reduced computation on the sample. In another aspect, the disclosed technologies can evaluate key factors on the population of records. In this way, the available computation resources can be better allocated, with compute intensive ML training performed on a smaller sample, and scoring of factor values, which can be less compute intensive, performed on a larger population to achieve accurate identification of the leading factor values. In a third aspect, the disclosed technologies can generate tuples of individual factors as candidate factors, enabling more precise identification of specific factor combinations associated with a metric, event, or outcome being studied. Moreover, the disclosed technologies can be natively implemented in a database language, Python, Java, R, or in other languages, thereby minimizing preprocessing required to fit data to a particular tool.

Varying combinations of such innovations can be implemented in a pipeline as described herein. Numerous advantages can be obtained, notably improved computational efficiency over conventional population-based approaches, as key factors are identified on a sample rather than an entire population, with significant reductions in storage and computation operations. Additionally, accuracy of results can be improved over conventional sample-based approaches, as the key factors and their associated factor values are evaluated on the entire population rather than on the sample. Furthermore, packaged as a pipeline, the disclosed technologies can be used without expert knowledge of data science, through simple user interfaces.

Terminology

The usage and meaning of all quoted terms in this section applies throughout this disclosure unless clearly indicated otherwise or repugnant to the context. The terminology below extends to related word forms.

The term "add" refers to joining one or more items with one or more like items, or incorporating the one or more items into a container of such items. The container can initially be empty. Particularly, a factor can be added to a set of factors, a record can be added to a set of records, a field can be added to a record, a column can be added to a table, a factor value can be added to a set of factor values, and so forth. Two sets or other groups of items can be added together to form a larger set or group of items.

The term "bin," as a verb, refers to organizing one or more data values into a finite number of non-overlapping data ranges. The data values can be values of a given parameter, variable, field, factor, or combinations or tuples thereof. As a noun, a "bin" can refer to any one of such data ranges. Bins can be one-dimensional or multi-dimensional. Bins can have same or varying sizes. The data values can be data values in a column of a data table, or values of a particular field across a collection of data records. By associating data values with a finite set of bins, the data values can be transformed to a categorical variable, with categories identified by indices or labels of corresponding bins. In some examples, the range of possible data values prior to binning can be a continuous variable, however this is not a requirement. Binning can also be used to reshape a categorical variable into another categorical variable with fewer categories (bins). In some examples, the data ranges for various bins can be predetermined, however this is not a requirement. Bins can be dynamically determined, for example based on percentiles of a distribution of the input data values. A "histogram" is a distribution of counts of data values across multiple bins.

A "categorical" variable is one which takes a finite set of values (the categories). A categorical variable taking just two values can also be dubbed a "binary" variable. As described herein, a continuous variable can be transformed to a categorical variable by binning. A categorical variable having K1 distinct values can also be binned to obtain another categorical variable with K2<K1 values. In some examples of the disclosed technologies, root factors can be categorical variables. Combinations of the root factors, such as candidate factors, key factors, or joint factors, can accordingly also be categorical variables. In further examples, a target metric can also be a categorical variable, often a binary variable. A target metric having three or more values (e.g. Outcome-1, Outcome-2, Outcome-3) can be converted into a binary variable (e.g. Outcome-1, Other-Outcomes) by suitable binning. Two categorical variables V1 and V2, having K1 and K2 values respectively, can be joined to form another categorical variable (dubbed a "joint variable" V3=V1∪V2) which can take up to K1×K2 values. In some cases, all K1×K2 values can be present, however this is not a requirement. In some examples, the variables V1, V2 can have a dependence or another constraint which eliminates some one or more of the notional K1×K2 values. Particularly, if V2 itself is a union V2=V1∪V4, then V3 can have the same number of values as V2, namely K2. A joint variable can also be formed by joining more than two categorical variables.

A "client" is a hardware or software computing entity that uses a resource provided by another hardware or software computing entity dubbed a "server."

The term "database" refers to an organized collection of data maintained on computer-readable media and accessible by execution of instructions at one or more processors. Databases can be relational, in-memory or on disk, hierarchical or non-hierarchical, or any other type of database. Some databases of interest in this disclosure are organized as "records," each record being a collection of fields having respective values. The fields of two records can be the same, while the corresponding values can be the same or can vary between records. In some examples, records can be organized as rows of a table, with like fields of the records forming a corresponding column of the data table. In varying examples, the specific organization of the table can differ, e.g. rows and columns can be swapped, or the table can be organized as a multi-dimensional array. Regardless of the physical or logical organization of the records or table, a "row" denotes one record, and a "column" denotes a collection of like fields (which can have varied values) over a collection of one or more records.

"Factor analysis" refers to any technique for determining which among a set of factors are significant predictor(s) of the value of a target metric. In some examples, factor analysis can be qualitative, i.e. merely identifying a subset of the candidate factors satisfying a criterion related to their usefulness in predicting the value of the target metric. In other examples, factor analysis can be quantitative, whereby the relative importance of different candidate factors can be determined and compared. A factor deemed important, according to some predetermined criterion, is dubbed a "key factor." Factors for which factor analysis is performed, and from which key factors are selected, are dubbed "candidate factors." Candidate factors can be directly selected among the fields of a data record or data table, or can be derived from such fields e.g. by joining two or more fields together. The original fields from which candidate factors can be constructed are dubbed "root factors." A root factor can be a candidate factor.

"Feature importance" is a quantitative attribute of a factor indicating its importance for predicting the value of a metric. In some examples, feature importances of a group of factors can be normalized so that they add up to one. In other examples, a feature importance can be a measure of the fraction of the variance of the metric that can be predicted by the corresponding factor. Feature importance can be determined by various techniques, including area under the ROC (receiver operating characteristics) curve ("AUC"); a chi-square test; or random permutation of a given feature. "Permutation feature importance" of the given feature is the decrease in a prediction score when the given feature is randomly shuffled.

The terms "metric" or "target metric" refers to a quantity of interest in a particular problem. The metric can take respective values for each of multiple records. The metric can be an existing field of the records, or can be a derived quantity. In examples where the metric is not an existing field, the metric can optionally be added to the records, e.g. as a new column in a table comprising the records, but this is not a requirement.

A "Motif score" (M) is a measure of predictive value of a particular factor value of a key factor. In some examples, half the harmonic mean of the factor value's F-beta score and the key factor's feature importance can be used. That is, $M^{-1}=F\beta^{-1}+FI^{-1}$, where FI and F$\beta$ are the feature importance and F-beta score respectively. A high Motif score can mean that both FI and F$\beta$ are high; if either FI or F$\beta$ is small, the Motif score M can also be small.

A "population" is a collection of data items having some common characteristic. The data items of a population can represent entities in the physical world or non-physical entities. Each data item can be a record, and the population can be organized in a database as a database table. In some examples of interest herein, the size of a population can be very large, with at least $10^5$, $10^6$, $10^7$, $10^8$, $10^9$, $10^{10}$, $10^{11}$, $10^{12}$, or even more records. Accordingly, the disclosed technologies can be applied using a subset of the population dubbed a "sample." In examples, the sample size can be about or at most $10^3$, $10^4$, $10^5$, $10^6$, $10^7$, $10^8$, or $10^9$ records, dependent on the population size and the available computing resources. At the present time, a sample size of $10^5$-$10^7$ is found to be effective for some examples, and it is anticipated that practical sample sizes may grow over time commensurate with increasing computer power. The sample can be a fairly small fraction of the population. In some examples, the ratio of sample size to population size can be about or at most 0.2, 0.1, 0.05, 0.02, $10^{-2}$, $10^{-3}$, $10^{-4}$, $10^{-5}$, or $10^{-6}$. The sample can also be organized in a database.

"Precision," "recall," and "accuracy" refer to quantitative measures of the predictive capability of one predictor variable value ("predictor value," e.g. a factor value of a key factor) for another target variable value ("target value," e.g. a sought value of a target metric). Denoting true positives (TP) as the number of records having both the predictor value and the target value, true negatives (TN) as the number of records having neither the predictor value nor the target value, false positives (FP) as the number of records having the predictor value but not the target value, and false negatives (FN) as the number of records having the target value but not the predictor value; then precision P=TP/(TP+FP), recall R=TP/(TP+FN), and accuracy A=(TP+TN)/(TP+FP+TN+FN). A related quantity "beta" ($\beta$) can be used as a weight. In some examples, $\beta$=(TP+FN)/(TP+FP+TN+FN), however this is not a requirement, and other weights can be used. In some examples, an "F-beta score" (F$\beta$) can be calculated as F$\beta$=$(1+\beta^2)\cdot P\cdot R/(\beta^2\cdot PR)$.

In the context of queries and corresponding responses, the terms "receive" and "transmit" refer to communication over a network, which can be in the form of a message. The communication can be electromagnetic, e.g. over wired, wireless, or optical media, but this is not a requirement.

A "tuple" is an unordered set of members having a specified size. For example, sets having 1, 2, 3, . . . members can be tuples, and can also be respectively described with terms such as "singlet," "pair," "triple," and so forth. Some tuples in this disclosure are candidate factors and a joint factor, obtained by combining corresponding root factors. The combination can be expressed as a tuple. Tuple "(Factor-1, Factor-2, Factor-3)" is a tuple formed by combining Factor-1, Factor-2, and Factor-3. Correspondingly, an example value of this tuple can be denoted as "Value-1⊗Value-2⊗Value-3", where Value-1, Value-2, Value-3 are respective values of the underlying factors Factor-1, Factor-2, Factor-3.

Example User Interface

FIGS. 1A-1B illustrate graphical user interface screens 101, 102 for an example of the disclosed technologies. FIG. 1A depicts a user interface input screen 101 whereby a user can configure an embodiment of the disclosed technologies, while FIG. 1B depicts an user interface output screen 102 displaying results to the user. The illustrated example pertains to root cause analysis of dropped calls.

Beginning with the input screen 101, the right-hand side has several fields whereby a user can make selections and set configuration parameters for a desired task. Menu item 112 allows the user to select a population of records over which factor analysis is desired. As illustrated, the user has selected "2019 Call Records" as the population of records. Menu item 114 allows the user to specify a target metric. As illustrated, the user has selected "Call Drop Event" as the target metric for which key factors or factor values are sought. Menu item 116 allows the user to specify the depth of combination of root factors to be considered. As illustrated, the user has selected "3" indicating that the individual root factors and all pairwise and three-way combinations will be considered. Menu item 118 allows the user to specify the sample size. As illustrated, the user has selected 2 million for the sample size. In varying examples, the menu item selections 112, 114, 116, 118 can be made from a drop-down menu (as indicated by the triangular buttons within each menu item), by free-form or predictive text entry, or by another user interface technique.

Turning to the left-hand pane 120 of screen 101, a selection of root factors 130 is offered, alongside respective checkboxes 132. A slider control 122 allows the user to scroll within the selections 130 and their respective checkboxes 132. The user can select or deselect each checkbox to choose desired root factors, for example with a mouse or other pointing device. As illustrated, the user has selected four root factors, namely "Weather condition," "Device motion," "Cell tower ID," and "Cell grid coordinate." Of these factors, the first three are self-explanatory, while the cell grid coordinate identifies a region within a particular cell, which can be associated with obstructions or other impediments to signal quality.

Numerous variations can be implemented. For example, the sample size can be specified as a fraction or percentage of the population size. In additional examples, the screen 101 can include a menu item for the user to select one or more ML tools to use for identifying key factors. In further examples, the screen 101 can include annunciators to indicate the population size, a current number of selected root factors, or an estimate of the run time required to perform the factor analysis as configured.

Turning to output screen 102, several highest scoring factor values are displayed, along with their respective scores. The highest score is for the top row 141, having key factor as a pair combination of "Cell Tower ID" and "Cell Grid Coordinate". The factor value for this pair can be #4435⊗"SW Far" meaning that "Cell Tower ID" has value #4435 and "Cell Grid Coordinate" has value "SW Far", indicating the portion of the cell distant from the instant cell tower (in this case, tower #4435) in the southwest direction. The displayed factor value can be separated into the values of the constituent root factors, as shown, for legibility. The corresponding score for this factor value is 0.205, about 15% higher than the next row 143. Row 143 has key factor "Weather condition" combined with "Device motion" and "Cell Tower ID", and the respective factor value "Rain>5 mm/hour" (for weather), "10-30 mph" (for device motion), and #3065 (for cell tower ID) as indicated. The third row 145 can be a singlet key factor, i.e. root factor "Device motion", with factor value ">30 mph." Finally, row 147 illustrates the fourth factor value "Wind>30 mph" (weather) and "10-30 mph" (device motion). As described further herein, various criteria can be used to select how many or which highest scoring factor values to display in output screen 102.

Numerous variations can be implemented. In some examples, the key factors can be displayed separately (e.g. in a separate pane) from the highest scoring factor values. In other examples, the top scores can be rendered graphically in screen 102 (e.g. as a pie chart). In further examples, the top scores can be normalized to a predetermined sum value, such as 1 or 100%.

First Example Method

Figure 2:
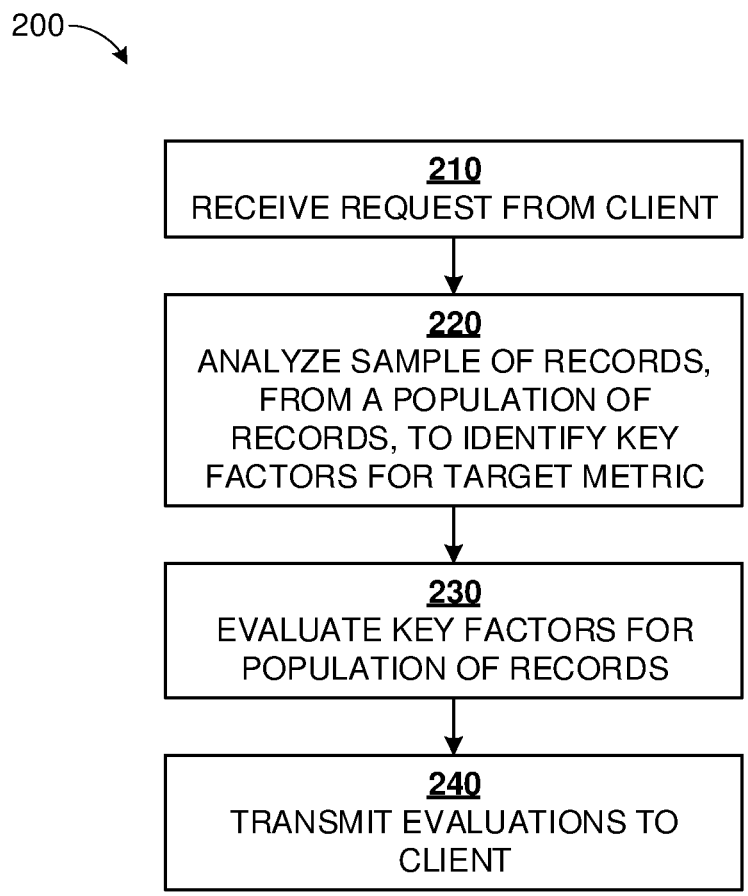
FIG. 2 is a flowchart of a first example method for processing a request according to the disclosed technologies.

FIG. 2 is a flowchart 200 of a first example method for processing a request to identify key factors for a target metric. In this method, a sample of a population can be used to improve the efficiency of handling the request. The key factors can be identified using a sample of records, and can then be evaluated on the population of records.

At process block 210, a request is received from a client. The request can indicate a population of records, a target metric, or one or more candidate factors. Items not indicated by the request can be predetermined or can be obtained by user prompts.

At process block 220, responsive to the request, a sample of records from the population can be analyzed to identify key factors for the target metric. In some examples, the sample can be obtained by stratified sampling. The analysis can be performed with a machine learning tool. The key factors can be selected from among candidate factors specified in the request, or from additional factors derived from such (root) factors. The candidate factors or the key factors can be categorical variables.

At process block 230, the key factors can be evaluated on the population of records. In some examples, scores can be determined for each factor value of the key factors. Then, at process block 240, one or more evaluations can be transmitted to the requesting client. The transmitted evaluations can include highest ranking factor values or their scores.

Numerous variations and extensions of the first method can be implemented, including some described herein.

Second Example Method

Figure 3:
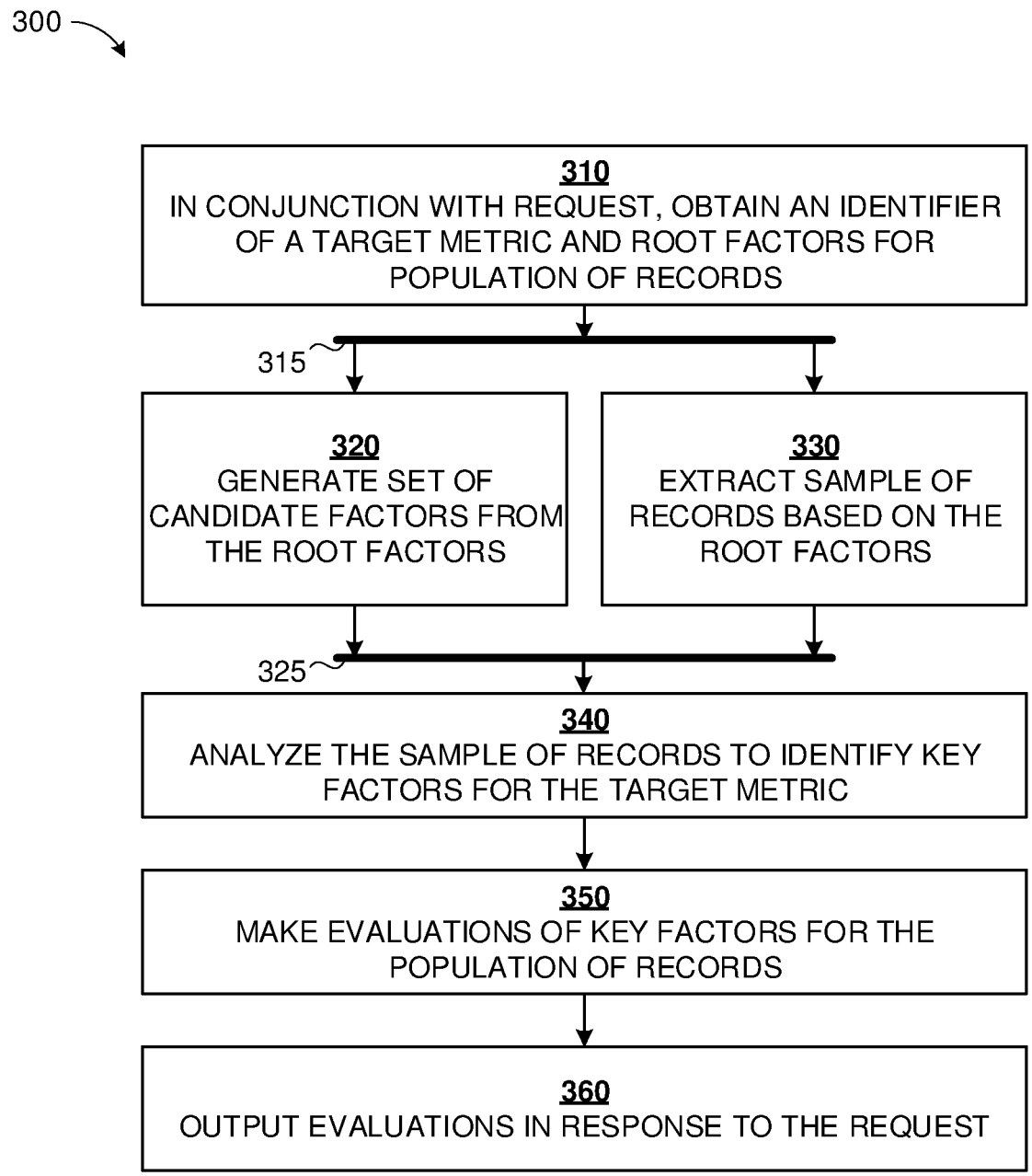
FIG. 3 is a flowchart of a second example method for processing a request according to the disclosed technologies.

FIG. 3 is a flowchart 300 of a second example method for processing a request to identify key factors of a target metric. The second method shares some features of the first method, and includes additional features for generating a set of candidate factors from which the key factors can be identified, and for extracting the sample of records from the population of records.

At process block 310, an identifier of a target metric and root factors can be obtained in conjunction with a request. The target metric and the root factors can pertain to a population of records. Then, at process block 320, a set of candidate factors can be generated from the root factors. In some examples, the set of candidate factors can include one or more of the root factors or one or more combinations of the root factors. At process block 330, a sample of records can be extracted from the population of records, based on the root factors. In examples, stratified sampling can be used, according to distributions of values of the root factors. In further examples, a joint factor can be formed from the root factors, and the stratified sampling can be performed according to the distribution of values of the joint factor. Process blocks 320, 330 can be performed in parallel using fork 315 and join 325 as illustrated, or they can be performed sequentially with either block 320 or block 330 preceding the other block. At process block 340, the sample of records can be analyzed to identify key factors for the target metric. In examples, the analysis can be performed by training a machine learning classifier. The key factors can be selected from among the candidate factors. At process block 350, the key factors can be evaluated for the population of records. Scores for respective values of the key factors can be determined, for example using feature importances of the key factors, or F-beta scores for the factor values. Then, at process block 360, one or more evaluations can be outputted or transmitted in response to the request. The outputted or transmitted evaluations can include one or more high scoring factor values corresponding key factors, or corresponding scores.

Numerous variations and extensions of the second method can be implemented, including some described herein. For example, at process block 340, multiple ML processes can be applied in parallel, or sequentially. These ML processes can use a same ML tool with different seeds or different samples, or different ML tools can be used. Unlike other ML applications, where a classifier is trained in order to use it to classify other records, examples of the disclosed technology can utilize output from a classifier training procedure (namely, feature importances), without subsequently using the trained classifier to classify any additional records. In varying examples, the request can come from a client device to a factor analysis tool hosted on a server; from a client software application co-resident with the factor analysis tool in a computing environment; or can be directly entered in a user interface of the factor analysis tool.

First Example Dataflow Diagram

Figure 4:
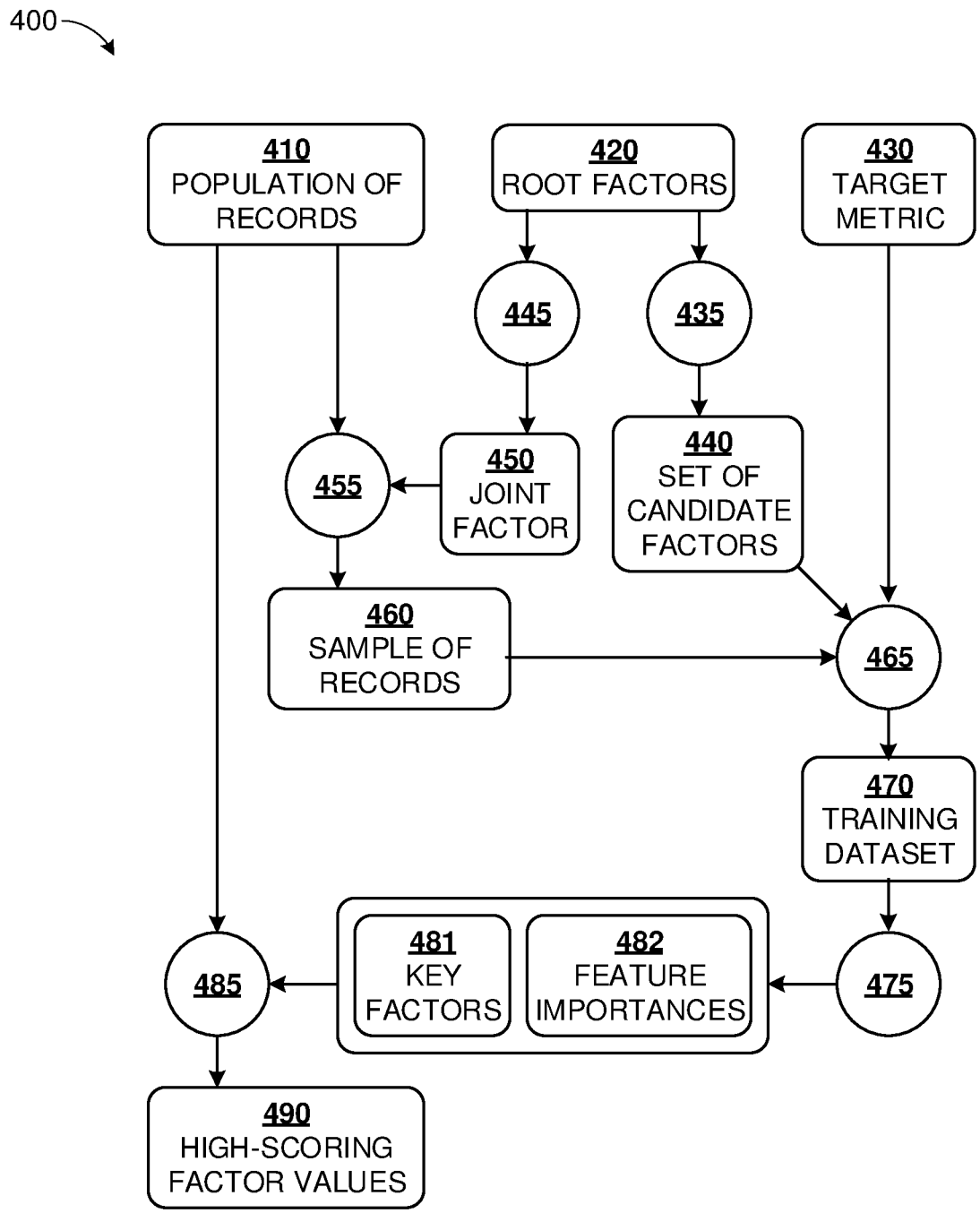
FIG. 4 is a dataflow diagram for processing a request according to an example of the disclosed technologies.

FIG. 4 is a dataflow diagram 400 for processing a request according to the disclosed technologies. The diagram proceeds from inputs 410, 420, 430 to output 490. Data item 410 can be a population of records for which a target metric 430 has been defined. Some root factors 420 can be provided, which can be fields of records in population 410, or columns in a database table storing the population 410. The output 490 can be high-scoring factor values determined to have leading predictive value for the target metric 430 on population 410.

The root factors 420 can be operated on by process block 435 to obtain a set of candidate factors 440. Process block 435 can be similar to process block 320 described herein. Process block 435 can include generation of combinations of the root factors 420 and inclusion of such combinations in the set of candidate factors 440. The root factors 420 can also be operated on by block 445 to obtain a joint factor 450. Process block 445 can be similar to process block 620 described herein. Process block 445 can form the joint factor 450 as a combination of all the root factors 420.

The joint factor 450 and the population of records 410 can be operated on by process block 455 to obtain a sample of records 460. Process block 455 can be similar to process blocks 630, 640 described herein. Process block 455 can perform stratified sampling on the population 410 according to values of the joint factor 450. In examples, a column for the joint factor 450 can be added to a database table storing the population 410, and the corresponding fields can be evaluated for all records of the population 410.

Then, the target metric 430, the set of candidate factors 440, and the sample of records 460 can be operated on by process block 465 to obtain a training dataset 470. Process block 465 can transform the sample of records 460 so that every record of sample 465 includes values for each of the candidate factors 440 as training inputs, and a value for the metric 430 as a label which is a training output.

In some examples, the metric 430 may be an existing field (column) of the sample 460. In other examples, a field for the metric 430 can be added to the population 410 prior to sampling at process block 455. In further examples a field for the metric 430 can be added to each record of sample 460 after sampling at process block 455. Where a field for the metric is added to records, a value for the metric can be determined and used to populate the metric field for each such record.

Similarly, some of the candidate factors 440, such as root factors 420, can be pre-existing in the database table or records of population 410. Others among candidate factors 440 can be combinations of root factors 420 that are not pre-existing in the database table or records of population 410. In some examples, such new factors can be added, evaluated, and populated as new fields to the database table or records of population 410 or sample 460. Thus in some examples, values of candidate factors 440 and values of target metric 430 may already be present in the sample 460, in which case no work is required at block 465.

The training dataset 470 can be operated on by process block 475 to obtain key factors 481 and their respective feature importances 482. Process block 475 can be similar to process block 340 described herein. Process block 475 can train a classifier on the training dataset 470. The trained classifier can incorporate feature importances for each of the candidate factors 440, which can be extracted and used to identify the key factors 481. The key factors 481 can be those candidate factors 440 having highest feature importance. The feature importances 482 can include respective feature importances 482 for each of the identified key factors 481.

Finally, the key factors 481, their respective feature importances 482, and the population 410 can be operated on by process block 485 to obtain high-scoring factor values 490. Process block 485 can be similar to process block 350 described herein. In some examples, the metric 430 can be binary-valued. Process block 485 can evaluate precision, recall, and F-beta scores for each factor value for each of the key factors 481. Process block 485 can further calculate a Motif score for each factor value, which can be a combined function of the F-beta score for that factor value and the corresponding feature importance for the corresponding key factor. The Motif scores can be ranked across factor values and all key factors, to select certain factor values or key factors according to a predetermined criterion.

Numerous variations and extensions of the illustrated dataflow can be implemented, including some described herein. For example, one or more of population 410, root factors 420, or target metric 430 can be selective from available databases or available fields of such databases (not shown).

Example Generation of Candidate Factors

Figure 5:
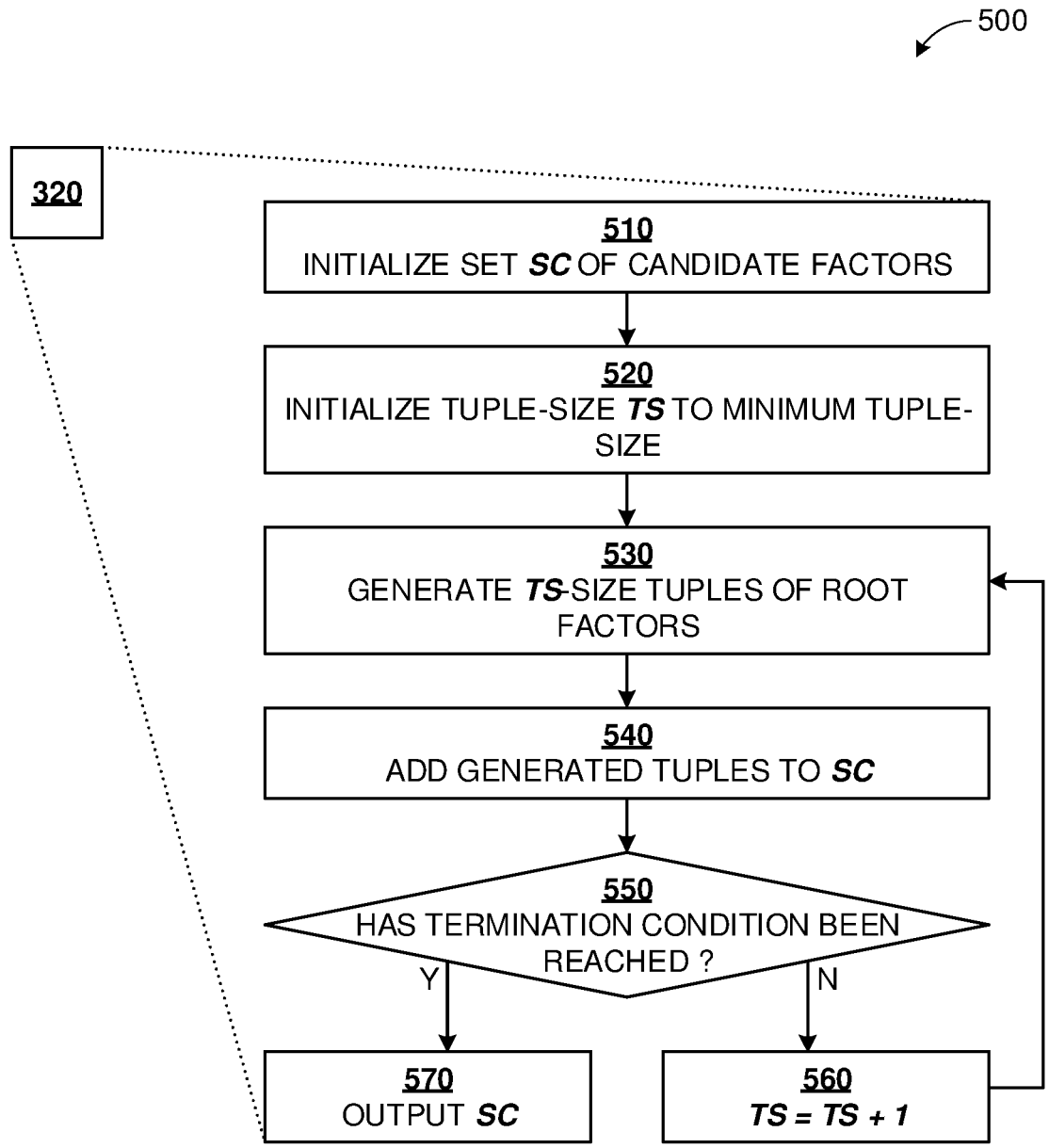
FIG. 5 is a flowchart of an example method for generating candidate factors according to the disclosed technologies.

FIG. 5 is a flowchart 500 of an example method for generating candidate factors. Tuples of root factors are formed to generate candidate factors. Tuples can be generated within a range of sizes, such as all tuples of length less than or equal to three. In some examples, this method can be used to implement process block 320 described herein. In other examples, this method can be used stand-alone or in combination with other operations.

At process block 510, a set SC of candidate factors can be initialized. At process block 520, a size variable TS can be set to a minimum tuple size. In some examples, SC can be initialized to an empty set { } at block 510, and TS can be initialized to 1 at block 520. In other examples, SC can be initialized as the set of root factors, thereby incorporating all singlets of the root factors with no additional computation, and TS can be initialized to 2.

Using the current value of TS, tuples of length TS can be generated at process block 530. In some examples, these tuples can include all combinations of TS root factors. To illustrate, with root factors A, B, C, E and length TS=2, the generated tuples can be {A, B}, {A, C}, {A, E}, {B, C}, {B, E}, {C, E}. In other examples, the generated tuples can be restricted according to a predetermined criterion. To illustrate, if the generated tuples are required to have at most one vowel, then {A, E} can be excluded from the generated tuples. In other examples, the generated tuples can be restricted if a total size of the set of candidate factors has been reached. To illustrate, if the set of candidate factors has a target size of seven, and includes the four singlets {A}, {B}, {C}, {E} after TS=1, then three more tuples are required at TS=2. Accordingly, {A, B}, {A, C}, {A, E} can be generated, while tuples {B, C}, {B, E}, {C, E} can be omitted.

At process block 540, the generated tuples can be added to set SC. At decision block 550, a termination condition can be tested. In varying examples, the termination condition can be an upper bound on tuple size TS; a target size of set SC; another condition; or a combination of conditions. If the termination condition is met, then the method follows the Y branch from block 550 to process block 570, where the set of candidate factors SC can be output. Output can be to a calling or supervisory computer program, or output can be to storage, or output can be a network transmission to another computing node. However, if the termination condition at block 550 has not been met, the method can follow the N branch from decision block 550 to block 560, where TS can be incremented. Program flow can return to block 530 to generate tuples of the next bigger size.

Numerous variations of this method can be implemented. For example, a loop over TS can be executed with a decrement at block 560, e.g. going 3-2-1 instead of 1-2-3. Alternatively, rather than looping over TS, the set of candidate factors can be generated by a tree traversal. To illustrate, candidate factors up to length three can be generated by depth first tree traversal in the order A, AB, ABC, ABE, AC, ACE, AE, B, BC, . . . .

First Example Extraction of Sample

Figure 6:
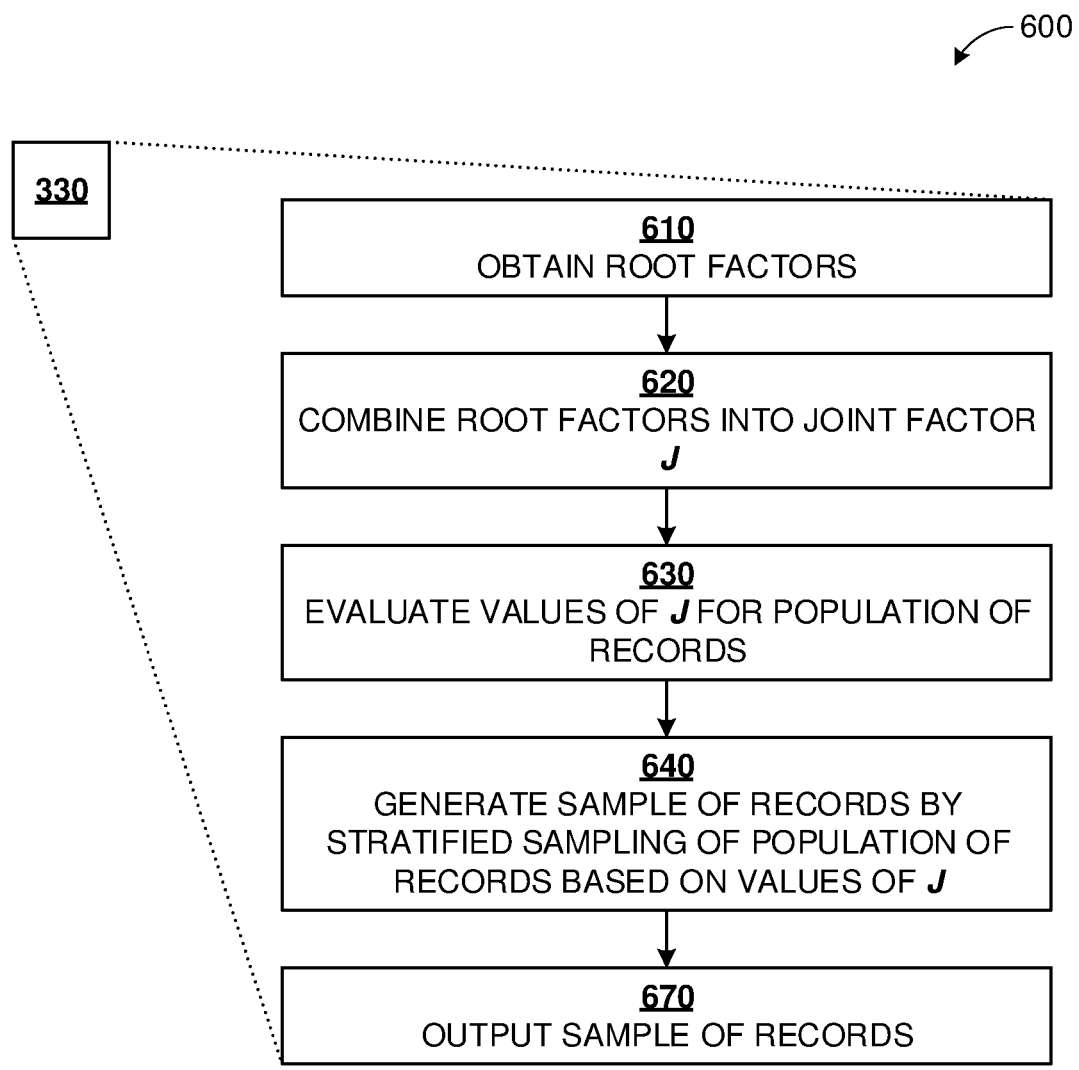
FIG. 6 is a flowchart of a first example method for extracting a sample of records according to the disclosed technologies.

FIG. 6 is a flowchart 600 of a first example method for extracting a sample of records from a population. Root factors are combined into a joint factor, and the values of the joint factor are used for stratified sampling on the population of records. In some examples, this method can implement process block 330 described herein. In other examples, this method can be used stand-alone or in combination with other operations.

At process block 610, a set SRF of root factors can be obtained. At block 620, the root factors in SRF can be combined to obtain a joint factor J. To illustrate, if the root factors are SRF={A, B, C, E}, then the joint factor can be a tuple J=(A, B, C, E) with value VA⊗VB⊗VC⊗VE, where VA, VB, VC, VE are the respective values of root factors A, B, C, E. That is, the value of J encodes the values of its components A, B, C, and E. Suitable projections of J can determine the values of these components (the root factors) or any other candidate factor composed of two or more of A, B, C, and E. At process block 630, the values of J can be evaluated for each record of the population of records. In some examples, records having one or more "undefined" values among A, B, C, E can be discarded, while in other examples, "undefined" can be treated as any other data value and such records can be retained.

At process block 640, stratified sampling can be used based on the distribution of values of joint factor J. To illustrate, if the target sample size is 10,000 and records with J=1020304 make up 3.1% of the population, then 3.1%×10,000=310 sample records can be chosen having this value of J. Repeated over all values of J (i.e. all combinations of values of the underlying root factors A, B, C, E), the sample of records can be completed. Finally, at process block 670, the sample of records can be output. Output can be to a calling or supervisory computer program; output can be to storage; or output can be a network transmission to another computing node.

Second Example Extraction of Sample

Figure 7:
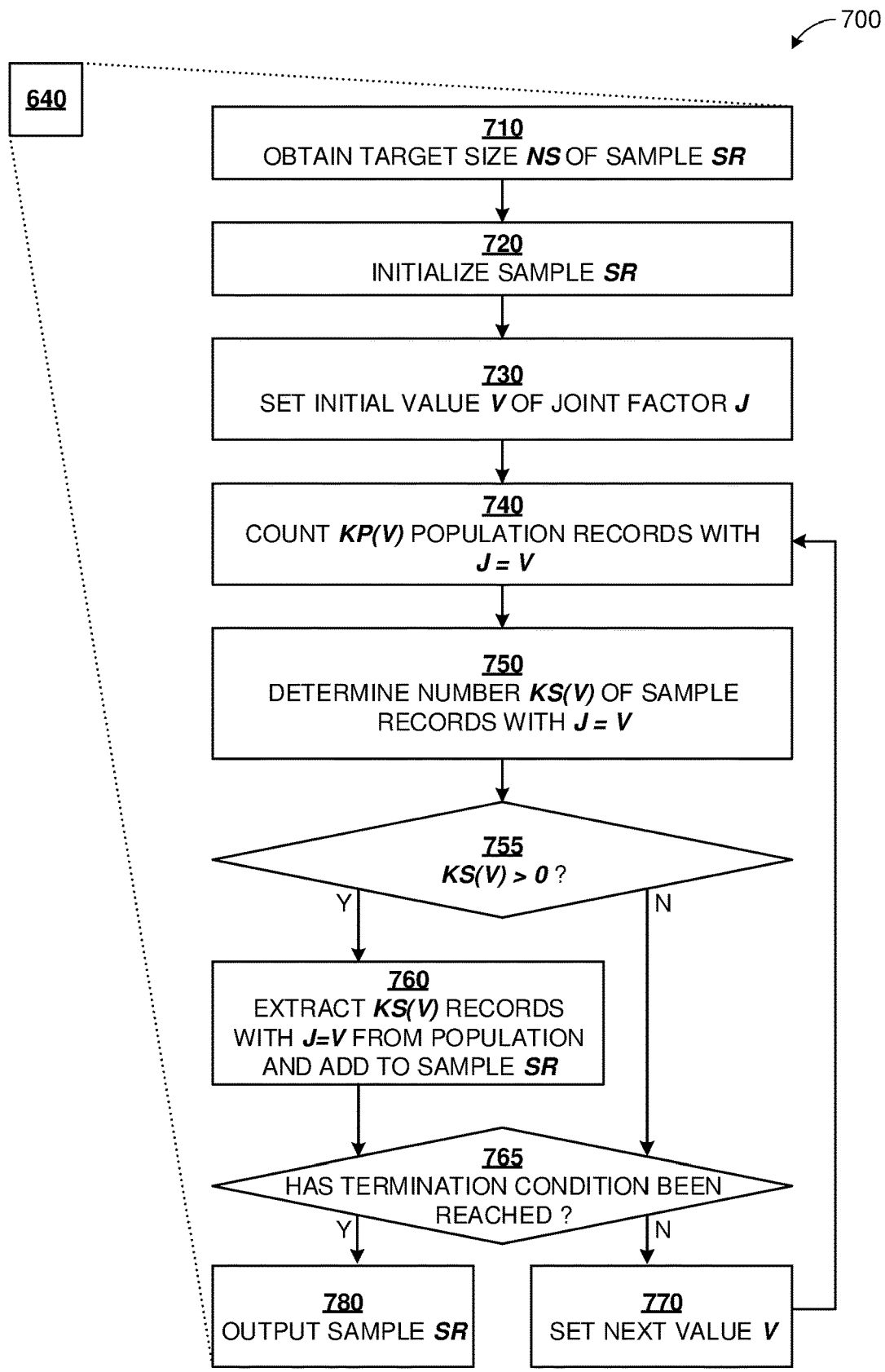
FIG. 7 is a flowchart of a second example method for extracting a sample of records according to the disclosed technologies.

FIG. 7 is a flowchart 700 of a second example method for extracting a sample of records. Stratified sampling on a population of records is performed according to values of a joint factor. In some examples, this method can implement process block 640 described herein. In other examples, this method can be used stand-alone or in combination with other operations.

At process block 710, a target size NS of the sample of records can be obtained. The target size can be partly or wholly based upon: the number of records in a population of records; on a number of root factors; on a number of candidate factors; on an amount of available computer resources; on a capacity of a machine learning tool to which the sample records will be input; on a constant; on other quantities; or any combination of these.

At process block 720, the sample SR can be initialized. In some examples, a data structure such as a table can be created or initialized, with columns for each candidate factor or a column for a metric. At process block 730, an initial value for a joint factor J can be set. To illustrate, if root factors A and E are binary with values "T" and "F", while root factors B, C are ternary each with values 1-3, then a number of possible values for J is 2×3×3×2=36, and the value V for J can initially be set to J=T⊗1⊗1⊗T, which is shorthand for the value corresponding to A="T", B=1, C=1, E="T".

At process block 740, the population records KP(V) having the instant value of V can be counted. To illustrate, out of 1 million total records of a population, KP(V)=234 can be found to have J=T⊗1⊗1⊗T, which is 234 ppm or 0.0234% of the total. At process block 750, the corresponding number of sample records KS(V) can be determined. In examples, this number can be chosen to provide proportionate representation of KP(V) population records within a smaller sample of TS records. A formula such as KS(V)=round (NS/NP×KP(V)) can be used, where NP is the population size, in number of records. For a target sample size of NS=100,000, with NP=1,000,000 and KP(V)=234, KS(V) can be calculated as KS(V)=round ((100,000/1,000,000)×234)=round (23.4)=23. At decision block 755, KS(V) can be compared to zero. If KS(V) is at least one, the method can follow the Y branch from block 755 to block 760, where KS(V) records can be extracted from the population and added to the sample records SR. Extraction can include selection of KS(V) among the KP(V) population records having the instant value V. The selection can be performed in various ways, such as: using random selection; selecting evenly distributed records (e.g. every tenth record among the KP(V) records); selecting KS(V) sequential records among the KP(V) records (e.g. the first 23 records); or by another technique. Suitable fields of the selected KS(V) records can be copied to a data structure storing the sample SR. For example, a new row can be added or filled in a table for SR, with entries for candidate factor fields or a target metric field. Some field entries can be copied directly from the population records, while other fields can be calculated as each of the KS(V) records is added to the sample SR.

Following addition of KS(V) records to the sample SR at block 760, the method can proceed to decision block 765, where a termination condition can be checked. Commonly, termination can be reached when all values V of the joint factor J have been processed. However, in variations of the method, other termination conditions can be used. Turning back to decision block 755, in some instances, a particular value V could result in KS(V)=0, e.g. if there are very few (or zero) records in the population having value V, leading to KS(V) before rounding being less than 0.5. In such instances, the method can follow the N branch from decision block 755 directly to block 765.

If the termination condition is satisfied, e.g. no more values V remain to be processed, then the method can follow the Y branch from decision block 780, for outputting the sample of records SR. Output can be to a calling or supervisory computer program; output can be to storage; or output can be a network transmission to another computing node. If the termination condition is not reached, then the method can follow the N branch from decision block 765 to block 770, for advancing V to the next value of joint factor J, and proceeding to block 740 to repeat with this next value V.

Numerous variations of the method can be implemented. For example, the single loop depicted from block 740 to 770 can be organized as two or more loops. Process block 740 can be executed for all values V, e.g. before block 730, for example as a single pass loop over the population of records, incrementing counters (for KP(V)) for respective values V of joint factor J for each record. Then, a loop from 750 to 770 can be restricted to those values of V for which KP(V) is greater than a threshold number of counts. The threshold number can be chosen such that KS(V) is at least one for such values of V, and decision block 755 can be omitted. As another example, KS(V) can be computed for all values of V, without rounding, and a suitable number of KS(V) can be rounded up so as to obtain the target size TS of the sample of records. That is, for one or more values V, a preliminary determination of KS(V) can be adjusted, so that at block 780 the output sample SR contains TS records. As a further example, block 710 can be omitted. A predetermined fraction PF can be incorporated into the calculation of KS(V), for example by a formula KS(V)=round (PF*KP(V)), leading to a sample size TS that can be approximately PF*NP.

Example Determination and Evaluation of Key Factors

Figure 8:
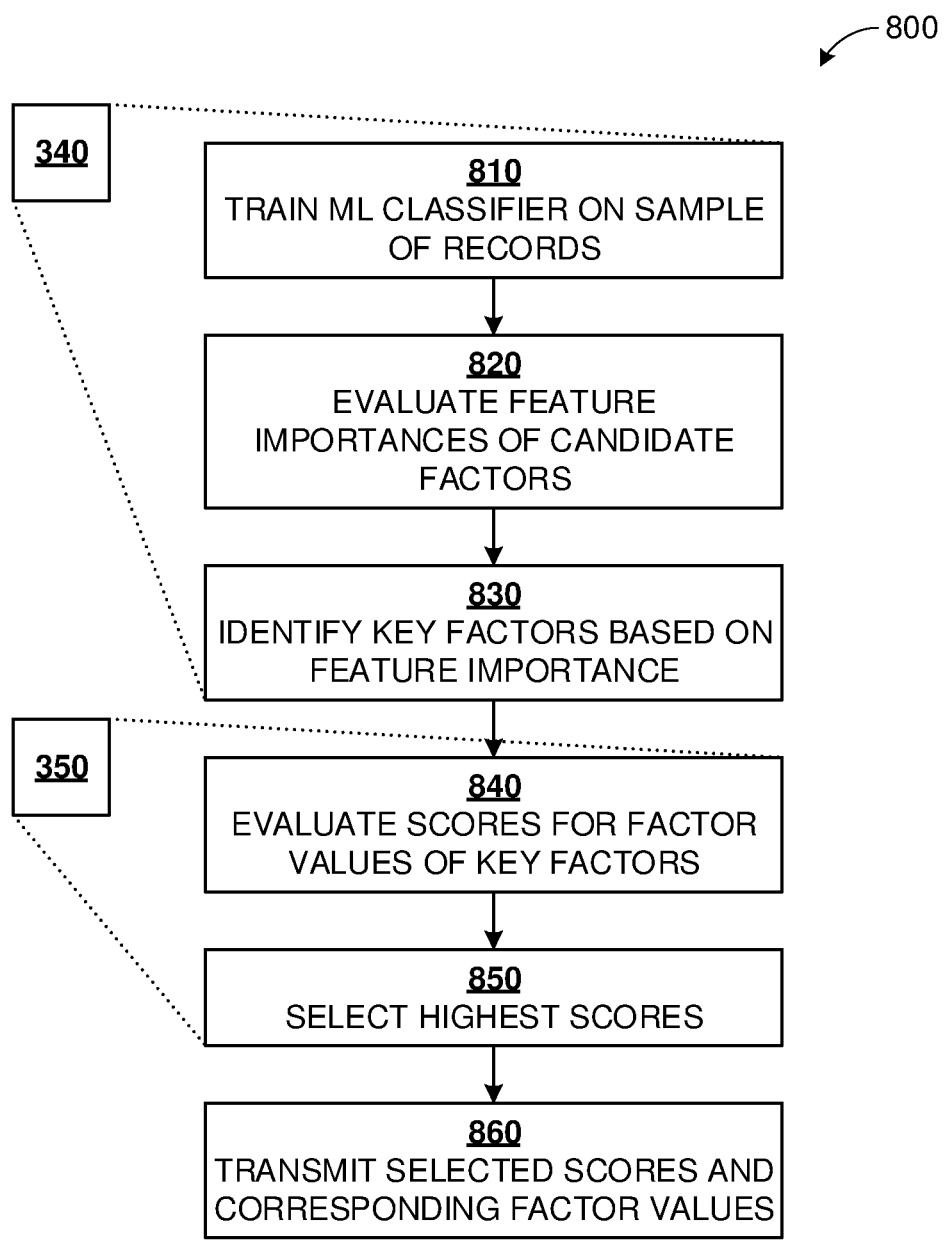
FIG. 8 is a flowchart of an example method for determining and evaluating key factors according to the disclosed technologies.

FIG. 8 is a flowchart 800 of an example method for determining and evaluating key factors. The key factors can be determined by training a machine learning classifier. The key factors can be evaluated by computing scores on a population of records. In some examples, this method can implement process blocks 340 and 350 described herein. In other examples, this method can be used stand-alone or in combination with other operations.

At process block 810, an ML classifier is trained on a sample of records, which can be obtained by a method described in context of FIG. 6 or FIG. 7, or by another method. That is, the sample of records can provide training data for the ML classifier, which can be a neural network, a decision tree, a random forest, or other such classifiers as are known in the art. Each sample record can include values for candidate factors, dubbed "factor values," which can be training inputs. The sample record can include a value of a target metric, which can be a label used as a training output.

The trained ML classifier can incorporate or provide feature importances for each of the candidate factors, which can be obtained at process block 820. Various techniques are available to compute feature importance. In some examples, a candidate factor can be a categorical variable having sufficient categories to allow an ROC (receiver operating characteristics) curve to be plotted with thresholds for the categorical variable between successive pairs of the categories. Then, a feature importance can be calculated as an area under the ROC curve in a similar fashion as for a continuous variable. In other examples, the feature importance can be calculated using a chi-square test to ascertain the independence between a candidate factor and the target metric—greater independence being interpreted as a low feature importance. In further examples, feature importance can be calculated by performing a change in a model fitting score when the candidate factor is randomly permuted between records—a small change in the model score indicating that the target metric is only weakly dependent on the permuted candidate factor and that the permuted candidate factor has low feature importance, and a large change in the model score indicating that the target metric is strongly dependent on the permuted candidate factor and that the permuted candidate factor has high feature importance. In some examples, the feature importances can be directly obtained through calls to an application programming interface (API) of the ML classifier.

At process block 830, key factors can be identified based on the feature importances of the various candidate factors. In some examples, the feature importances of the candidate factors can be ranked, and the candidate factors with the highest feature importances can be identified as key factors. Various criteria can be applied to guide the selection of the key factors. In some examples, a preset number of highest-ranking candidate factors can be selected as the key factors. The preset number can be dependent on the number of candidate factors, or on the number of root factors from which the candidate factors were generated. In other examples, all candidate factors having feature importance above a predetermined threshold can be selected as the key factors. In further examples, the key factors can be selected so that each of the root factors is represented in at least one of the key factors. In additional examples, the key factors can be selected such that the sum of their features is at least equal to a threshold. Combinations of these and other criteria can also be used.

At process block 840, scores can be evaluated for each of the key factors. In some examples, a particular value of the target metric can be of interest, which can be dubbed a "sought metric value." Each factor value of each key factor can be evaluated for its association with the sought metric value. The evaluation can be performed over the population of records. In some examples, an F-beta score can be calculated. In further examples, the F-beta score can be combined with a feature importance of the associated key factor to determine a Motif score. The Motif score can be a harmonic mean of the F-beta score and the feature importance of the key factor, or proportional to such harmonic mean.

At process block 850, the scores can be ranked to determine the factor values and respective key factors having the highest scores. In some examples, a predetermined number of the highest scores can be selected, while in other examples, all high scores above a predetermined threshold can be selected. In further examples, the selected scores can include at least one score for each key factor.

Finally, at process block 860, the selected factor values, the corresponding scores, or identifiers of the key factors, in any combination, (collectively, "output records") can be outputted, for example, by transmitting the output records to a requesting client. In variations, the output records can also be returned to a supervisory computer program, or stored locally or remotely.

Second Example Dataflow Diagram

Figure 9:
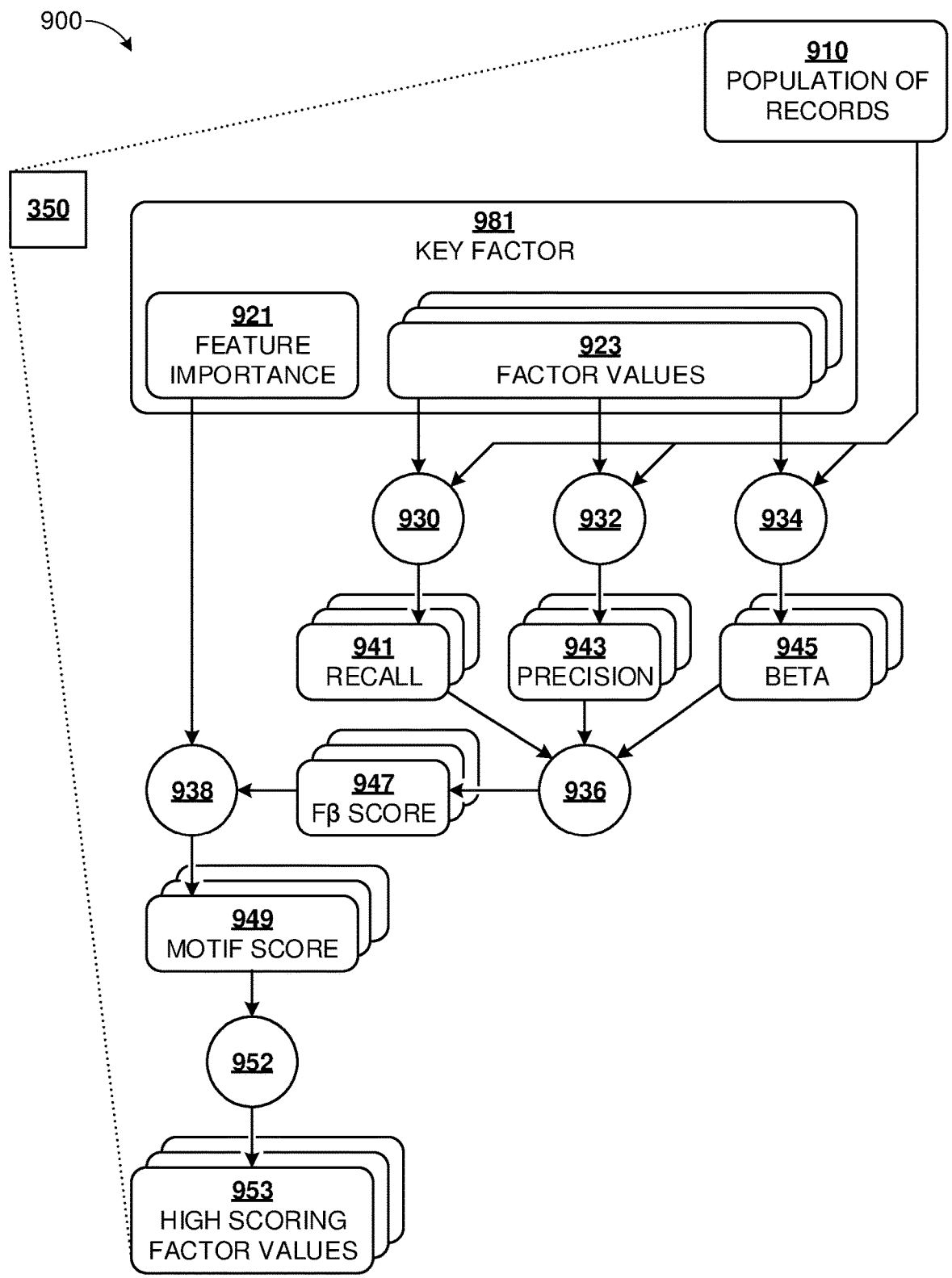
FIG. 9 is a dataflow diagram for evaluating key factors according to an example of the disclosed technologies.

FIG. 9 is a dataflow diagram 900 for evaluating a key factor. The diagram proceeds from inputs 910, 981 to output 953. Data item 910 can be a population of records for an example deployment of the disclosed technologies, and key factors 981 can be determined as described herein, for example at blocks 220, 340, 475, or 830. As a categorical variable, each key factor 981 can have two or more factor values 923 and a feature importance 921. The feature importance can be determined as described herein, for example in context of blocks 220, 340, 475, or 820. The factor values 923 can be inherent in the specifications of key factor 981, can be derived from the factor values of constituent root factors, or can be obtained by e.g. binning or re-binning another domain of values for key factor 981. The bulk of dataflow diagram 900 (from key factor 981 to Motif scores 949) is drawn for a single key factor 981; similar dataflow can be applied to other key factors 981 as well.

The factor values can be evaluated at process blocks 930, 932, 934 respectively to determine recall 941, precision 943, and beta 945 for a sought value of a target metric included within population 910. As indicated by the multiplicity of recall 941, precision 943, and beta 945 depicted in FIG. 9, a separate value of recall 941 can be computed respectively for each factor value 923 of an instant key factor 981. At process block 936, the values of recall 941, precision 943, and beta 945 can be combined to obtain F-beta scores (Fβ) 947 for respective factor values 923. At process block 938, a Motif score 949 can be calculated from each factor value's F-beta score 947, and the corresponding key factor's feature importance 921. The Motif score 949 can balance the feature importance 921 with the F-beta score 947. In some examples, the Motif score 949 can be proportional to the harmonic mean of the feature importance 921 and the F-beta score 947. Thus, a factor value having low F-beta score 947 can have a low Motif score, even if the key factor 981 has a high feature importance 921. Conversely a factor value having low or high F-beta score 947 can have a low Motif score if the corresponding key factor 981 has a low feature importance 921. A high Motif score 949 can result for a factor value 923 of a key factor 981 when the key factor 981 has high feature importance 921 and the factor value 923 also has high F-beta score 947.

With Motif scores 949 for factor values 923 of the instant key factor 921, and similarly for other key factors 921, the highest scoring factor values 953 can be selected at process block 952, on the basis of their Motif scores 949.

Numerous variations of the dataflow can be implemented. For example, the highest scoring factor values 953 can be chosen on the basis of their rank, e.g. from the N top-ranking Motif scores, where N is a predetermined positive integer. In other examples, the highest scoring factor values 953 can be chosen based on having Motif scores above a threshold. In further examples, the highest scoring factor values 953 can be chosen such that at least one factor value 923 is chosen for each of the key factors 921. The formulae described herein for computation of the Motif scores 949 are exemplary, and other formulae to evaluate leading factor values 953 can be used. Still further, in some examples, calculation of Motif scores 949 or F-beta scores 947 can be omitted for some among the factor values 923, based on one or more heuristics or other criteria. For example, factor values 923 having one or more among recall 941, precision 943, or beta 945 below a respective threshold can be discarded prior to process block 936 as being unlikely to be selected as a high scoring factor value 953. Inasmuch as such pruning has the goal of identifying the same high scoring factor values 953, albeit with less computation, this approach can be equivalent to evaluating F-beta scores 947 or Motif scores 949 fully for all factor values 923.

Example Database Table

Figure 10:
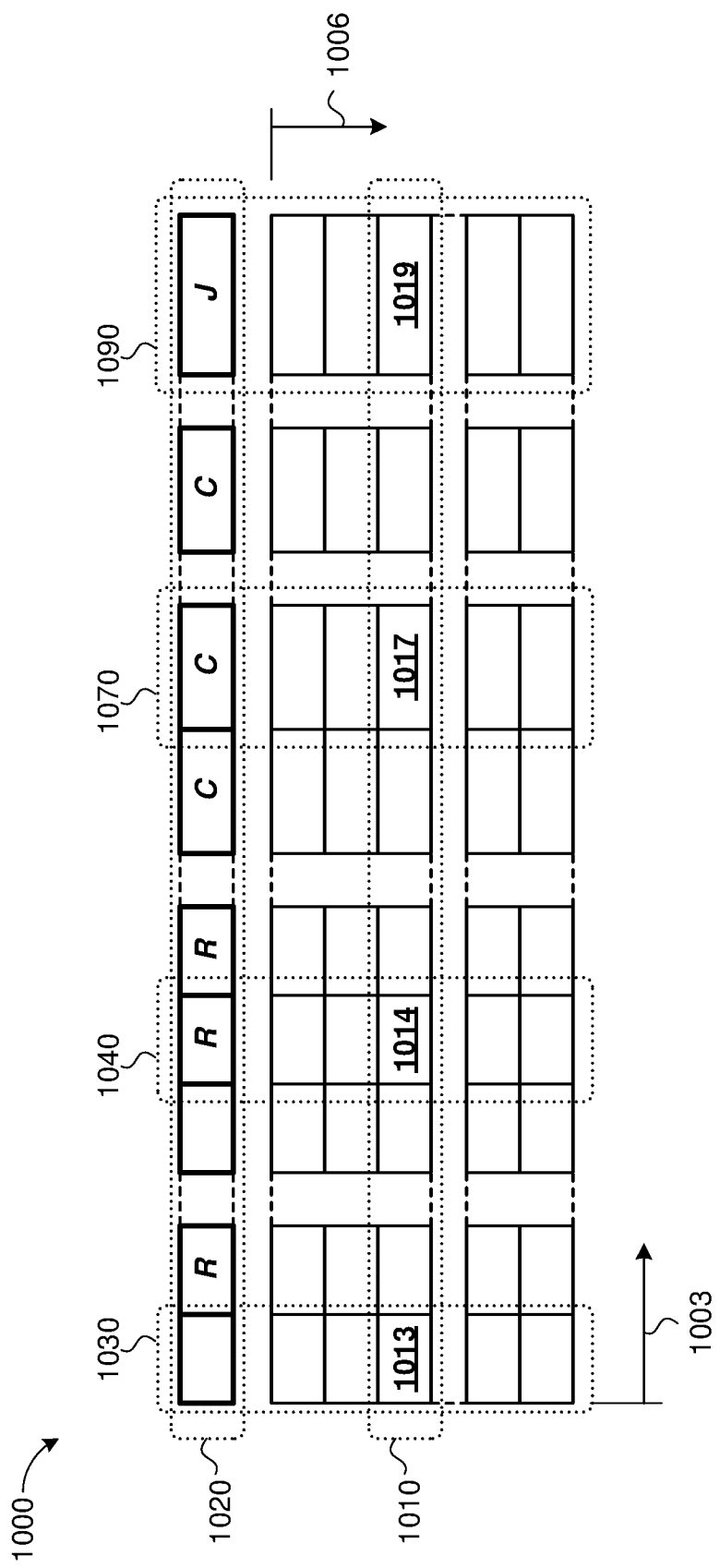
FIG. 10 is a diagram of a database table according to an example of the disclosed technologies.

FIG. 10 is a diagram of an example database table 1000 organized as rows and columns, which can be used to store a population of records or a sample of records in certain examples of the disclosed technologies. A row index increases going down the table as shown by arrow 1006. Row 1010 is a representative row, which can store a record. A column index increases going from left to right as shown by arrow 1003. Column 1040 is a representative column, which can store a common field shared by the records of table 1000. Also shown in FIG. 10 is a header row 1020, the fields of which can contain names or other identifiers for the respective columns. In varying examples, header row 1020 can be stored with table 1000, can be stored separately from table 1000, or can be merely an illustrative convenience— that is, table 1000 need not have such a header row 1020.

Certain of the columns, such as column 1040, can correspond to root factors of an instant factor analysis task, and are indicated by "R" in the header row 1020. Field 1014 can contain the value of root factor 1040 for the record of row 1010. Table 1000 can also contain other columns such as column 1030, which are not root factors of the instant task. Field 1013 can contain the value of column 1030 for the record 1010. Different factor analysis tasks on a given population of records can use different sets of root factors. That is, column 1030, which is not a root factor for the illustrated example, could be a root factor for a different factor analysis task. Conversely, column 1040, which is a root factor for the illustrated task, can be omitted as a root factor in another task.

Table 1000 can also include columns such as column 1070 for candidate factors other than root factors, as indicated by "C" in the header row 1020. For example, candidate factor 1070 can be a combination of two or more of the root factors ("R") as described in context of blocks 320, 435, or 530. The set of candidate factors for an instant factor analysis task can include one or more of the root factors ("R"), as described herein. Field 1017 can contain the value of candidate factor 1070 for the record 1010.

Table 1000 can also include column 1090 for joint factor, as indicated by "J" in header row 1020. The values of joint factor 1090 can be a tuple or union of the values of the individual root factors ("R"). Field 1019 can contain the value of joint factor 1090 for the record 1010.

In some examples, one or more of candidate factors ("C") 1070 or joint factor ("J") 1090 can be pre-existing in a population of records. In further examples, such factors can have been added to the population database during performance of a previous factor analysis task. In other examples, one or more columns for candidate factors ("C") 1070 or joint factor ("J") 1090 can be added during the execution of the instant factor analysis task. For example, column 1090 can be added during execution of a process block similar to 455 or 620. Column 1070 can be added during execution of a process block similar to 320, 465, or 820.

In some examples, a sample of records similar to 460 and a population of records similar to 410 can have matching organization, with the same columns (fields). In other examples, columns not needed in one or the other of the sample or the population can be omitted to economize on storage or copy operations. For example, non-root columns such as column 1030 can be omitted from the sample of records. Joint factor column 1090 can also be omitted from the sample of records. Candidate factors 1070 can be used both for determination of feature importance as at block 340, 475, or 820, and for evaluating scores for factor values of key factors, as at block 350, 485, or 840. Thus, candidate factors 1070 and root factors 1040 (which can also be candidate factors) can be retained in both the population of records and in the sample of records.

Numerous variations of this database table can be implemented. For example, an alternative database organization can be used. The data of population records can be distributed among two or more tables of a relational database. The sample records can be implemented as a list (e.g. single column) of pointers to the associated records in the population of records. In some examples, joint factor 1090 ("J") can be one of the candidate factors ("C").

A Generalized Computer Environment

Figure 11:
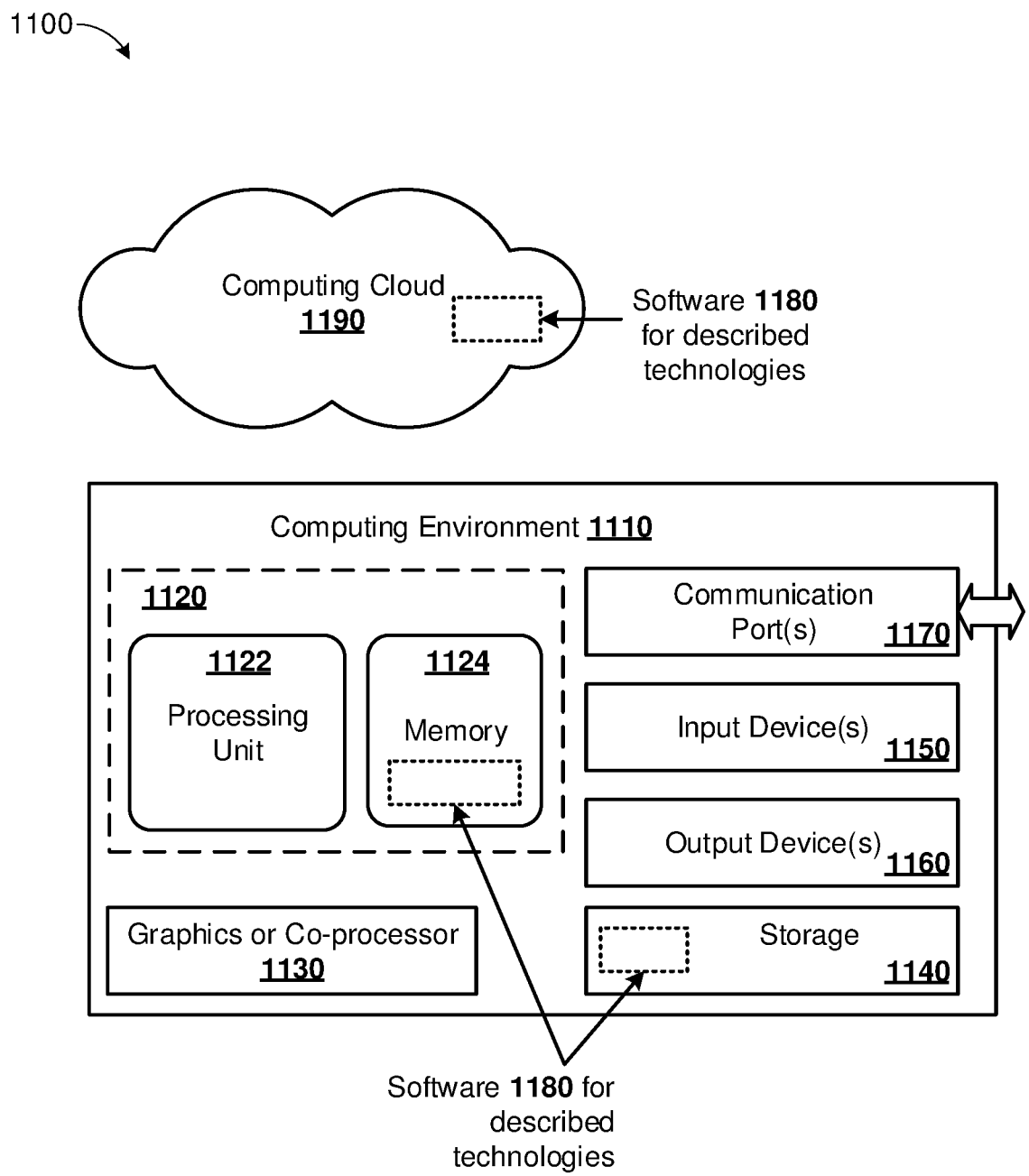
FIG. 11 is a diagram schematically depicting a computing environment suitable for implementation of disclosed technologies.

FIG. 11 illustrates a generalized example of a suitable computing system 1100 in which described examples, techniques, and technologies, including construction, deployment, operation, and maintenance of a factor analysis pipeline, or components thereof, can be implemented according to disclosed technologies. The computing system 1100 is not intended to suggest any limitation as to scope of use or functionality of the present disclosure, as the innovations can be implemented in diverse general-purpose or special-purpose computing systems.

With reference to FIG. 11, computing environment 1110 includes one or more processing units 1122 and memory 1124. In FIG. 11, this basic configuration 1120 is included within a dashed line. Processing unit 1122 executes computer-executable instructions, such as for implementing any of the methods or objects described herein for performing factor analysis tasks, or various other architectures, components, handlers, managers, modules, or services described herein. Processing unit 1122 can be a general-purpose central processing unit (CPU), a processor in an application-specific integrated circuit (ASIC), or any other type of processor. In a multi-processing system, multiple processing units execute computer-executable instructions to increase processing power. Computing environment 1110 can also include a graphics processing unit or co-processing unit 1130. Tangible memory 1124 can be volatile memory (e.g., registers, cache, or RAM), non-volatile memory (e.g., ROM, EEPROM, or flash memory), or some combination thereof, accessible by processing units 1122, 1130. The memory 1124 stores software 1180 implementing one or more innovations described herein, in the form of computer-executable instructions suitable for execution by the processing unit(s) 1122, 1130. The memory 1124 can also store a population or sample of records, sets of root factors, candidate factors, key factors, or their respective factor values or other attributes; configuration data, user interface buffers or displays, browser code, data structures including data tables, working tables, change logs, output structures, input fields, output fields, data values, indices, or flags, as well as other operational data.

A computing system 1110 can have additional features, such as one or more of storage 1140, input devices 1150, output devices 1160, or communication ports 1170. An interconnection mechanism (not shown) such as a bus, controller, or network interconnects the components of the computing environment 1110. Typically, operating system software (not shown) provides an operating environment for other software executing in the computing environment 1110, and coordinates activities of the components of the computing environment 1110.

The tangible storage 1140 can be removable or non-removable, and includes magnetic disks, magnetic tapes or cassettes, CD-ROMs, DVDs, or any other medium which can be used to store information in a non-transitory way and which can be accessed within the computing environment 1110. The storage 1140 stores instructions of the software 1180 (including instructions and/or data) implementing one or more innovations described herein.

The input device(s) 1150 can be a mechanical, touch-sensing, or proximity-sensing input device such as a keyboard, mouse, pen, touchscreen, trackball, a voice input device, a scanning device, or another device that provides input to the computing environment 1110. The output device(s) 1160 can be a display, printer, speaker, optical disk writer, or another device that provides output from the computing environment 1110.

The communication port(s) 1170 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1100 can also include a computing cloud 1190 in which instructions implementing all or a portion of the disclosed technology are executed. Any combination of memory 1124, storage 1140, and computing cloud 1190 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, software objects, classes, components, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 12:
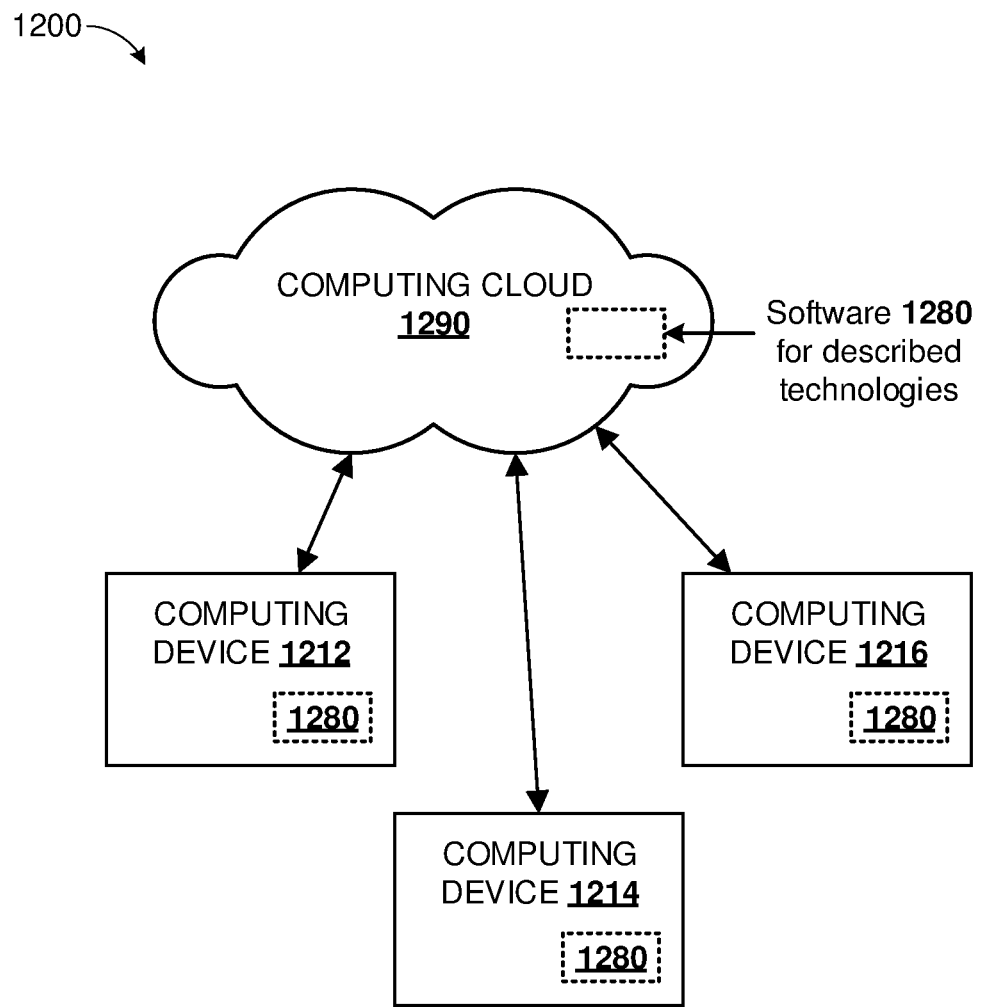
FIG. 12 is a diagram schematically depicting computing devices operating in conjunction with a computing cloud for implementation of disclosed technologies.

FIG. 12 depicts an example cloud computing environment 1200 in which the described technologies can be implemented. The cloud computing environment 1200 comprises a computing cloud 1290 containing resources and providing services. The computing cloud 1290 can comprise various types of cloud computing resources, such as computer servers, data storage repositories, networking resources, and so forth. The computing cloud 1290 can be centrally located (e.g., provided by a data center of a business or organization) or distributed (e.g., provided by various computing resources located at different locations, such as different data centers and/or located in different cities or countries).

The computing cloud 1290 can be operatively connected to various types of computing devices (e.g., client computing devices), such as computing devices 1212, 1214, and 1216, and can provide a range of computing services thereto. One or more of computing devices 1212, 1214, and 1216 can be computers (e.g., servers, virtual machines, embedded systems, desktop, or laptop computers), mobile devices (e.g., tablet computers, smartphones, or wearable appliances), or other types of computing devices. Communication links between computing cloud 1290 and computing devices 1212, 1214, and 1216 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 1212, 1214, and 1216 can also be connected to each other.

Computing devices 1212, 1214, and 1216 can utilize the computing cloud 1290 to obtain computing services and perform computing operations (e.g., data processing, data storage, and the like). Particularly, software 1280 for performing the described innovative technologies can be resident or executed in the computing cloud 1290, in computing devices 1212, 1214, and 1216, or in a distributed combination of cloud and computing devices.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "add," "adjust," "aggregate," "analyze," "apply," "bin," "calculate," "call," "combine," "compare," "compute," "configure," "count," "determine," "display," "evaluate," "extract," "fork," "form," "generate," "identify," "increment," "initialize," "insert," "invoke," "join," "loop," "normalize," "obtain," "output," "perform," "predict," "preprocess," "process," "receive," "remove," "render," "request," "return," "retrieve," "round," "select," "send," "set," "store," "sum," "test," "train," transmit," "update," or "use" to indicate computer operations in a computer system. These terms denote actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 11, computer-readable storage media include memory 1124, and storage 1140. The term computer-readable storage media does not include signals and carrier waves. In addition, the term computer-readable storage media does not include communication ports (e.g., 1170) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, Angular, C, C++, C#, Curl, Dart, Fortran, Go, Java, JavaScript, *Julia*, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computer system that implements a factor analysis tool on one or more hardware processors with memory coupled thereto, a method comprising:
    receiving a request from a client, the request specifying a plurality of root factors, and responsive to the request:
        performing stratified sampling on a population of records to generate a sample of records by:
            combining the root factors into a joint factor;
            determining respective values of the joint factor for each record of the population of records;
            wherein each of the values is shared by a respective subgroup of the population of records, the subgroup having a cardinality; and
            for each of the subgroups, selecting a number of members of the sample of records from the subgroup, the number proportional to the cardinality of the subgroup;
        analyzing the sample of records;
        identifying, based on the analyzing, a plurality of key factors for a target metric, wherein the records of the population of records store values for each of the key factors from a set of values ("factor values") for that key factor;
        making evaluations of the key factors for the population of records and determining a plurality of scores by, for each of the key factors and at least one respective factor value:
            determining a corresponding score, of the plurality of scores, over all of the records of the population, for that factor value;
        ranking the plurality of scores; and
        based on the ranking:
            determining one or more of the factor values having highest-ranked scores according to a predetermined criterion; and
            transmitting the one or more determined factor values to the client.

2. The method of claim 1, wherein
    the method further comprises generating a set of candidate factors from the root factors; and
    wherein the key factors are selected from among the set of candidate factors.

3. The method of claim 2, wherein the generating the set of candidate factors comprises:
    initializing the set of candidate factors; and
    for each tuple size of a plurality of tuple sizes:
        generating a plurality of tuples of the root factors, each of the generated tuples having size equal to the respective tuple size; and
        adding the generated tuples to the set of candidate factors.

4. The method of claim 3, wherein the plurality of tuples comprises all combinations of the root factors having the respective tuple size.

5. The method of claim 1, further comprising:
    adding a column for the joint factor to a database storing the population of records; and
    for each record of the population of records:
        determining a corresponding value of the joint factor; and
        storing the corresponding value in the added column.

6. The method of claim 1, wherein the generating the sample of records comprises:
    initializing the sample of records;
    for each value of the values of the joint factor:
        counting a number of records in the population of records having the respective value;
        determining a target number of records in the sample of records with the respective value; and
        in at least one case where the target number of records is greater than zero:
            extracting the target number of records with the respective value from the population of records; and
            adding the target number of extracted records to the sample of records.

7. The method of claim 6, wherein the generating the sample of records further comprises obtaining a target size of the sample of records; and
    the determining the target number of records comprises, for at least a given value of the joint factor:
        making a determination of a preliminary number of records; and
        adjusting the preliminary number to determine the target number of records;
    so that the generated sample of records has the target size.

8. The method of claim 1, wherein the root factors are categorical variables.

9. The method of claim 1, wherein each record of the sample of records comprises the factor values for respective factors of a set of candidate factors and a label value for the target metric, and wherein the analyzing comprises:
    training a classification machine learning tool on the sample of records, with the factor values being training inputs and the label value being a training output;

evaluating, from the trained classification machine learning tool, respective feature importances of a plurality of factors among the set of candidate factors; and identifying the key factors among the set of candidate factors based on the feature importances.

10. The method of claim 9, wherein the identifying the key factors comprises:

determining that the feature importance of a given one of the candidate factors is greater than or equal to a predetermined threshold; and identifying the given candidate factor as one of the key factors.

11. The method of claim 9, wherein the respective feature importances of a given one of the factors are determined based on: an area under a curve (AUC); chi-square evaluation; or random permutation of the given factor.

12. The method of claim 1, wherein the plurality of scores include a given score corresponding to a given factor of the key factors and a given respective factor value of the plurality of factor values, and the determining the given score comprises:

determining a feature importance (FI) for the given factor;

determining an F-beta score (Fb) for the given respective factor value; and determining the given score as proportional to a harmonic mean of Fb and FI: 1/(1/Fb+1/FI).

13. The method of claim 1, wherein the population of records comprises at least one million records.

14. One or more computer-readable storage media storing instructions which, when executed by one or more hardware processors configured to handle a factor analysis request, cause the one or more hardware processors to perform operations comprising:

in conjunction with the factor analysis request, analyzing a sample of records, from a population of records, based on feature importances of respective factors, and thereby identifying key factors for a target metric;

wherein the records of the population of records store values, for each of the key factors, from a set of values ("factor values") for the respective key factor;

determining respective scores for a plurality of factor values of the key factors, each of the scores being determined over the population of records for a corresponding one of the factor values, the respective score being determined by:

determining an F-beta score (Fb) for the corresponding factor value; and determining the respective score as proportional to a harmonic mean of Fb and I: 1/(1/Fb+1/FI), wherein FI is the feature importance of the key factor associated with the corresponding factor value; and outputting one or more evaluations based on ranks of the determined scores in response to the factor analysis request.

15. The one or more computer-readable storage media of claim 14, wherein the operations further comprise:

generating a set of candidate factors from root factors by:

initializing the set of candidate factors; and for each tuple size TS of a plurality of tuple sizes:

generating a plurality of tuples of the root factors, each of the generated tuples having size equal to TS; and adding the generated tuples to the set of candidate factors; and extracting the sample of records from the population of records by:

combining the root factors into a joint factor;

evaluating values of the joint factor for the population of records; and generating the sample of records by stratified sampling of the population of records according to the values of the joint factor.

16. The one or more computer-readable storage media of claim 14, wherein each record of the sample of records comprises categorical factor values for respective factors of a set of candidate factors and a label value for the target metric, and wherein:

the analyzing operation further comprises:

training a classification machine learning tool on the sample of records, with the factor values being training inputs and the label value being a training output;

evaluating, from the trained classification machine learning tool, the respective feature importances of a plurality of factors among the set of candidate factors; and identifying the key factors among the set of candidate factors based on the feature importances; and the operations further comprises:

evaluating respective scores for each of the factor values of the key factors; and selecting one or more of the factor values having highest score(s) among the respective scores; and wherein the outputted one or more evaluations comprise the selected factor values.

17. A system comprising:

one or more hardware processors, with memory coupled thereto;

computer-readable media storing instructions, executable by the one or more hardware processors, for responding to a request, the instructions comprising:

first instructions for obtaining an identifier of a target metric, and root factors, for a population of records;

second instructions for generating a set of candidate factors from the root factors;

third instructions for extracting a sample of records from the population of records, based on the root factors;

fourth instructions for analyzing the sample of records to identify key factors, among the set of candidate factors, for the target metric;

wherein the records of the population of records (which comprise the records of the sample of records) store values, for each of the key factors, from a set of values ("factor values") for the respective key factor;

fifth instructions for determining respective scores for a plurality of factor values of the key factors, each of the scores being determined over the population of records for a corresponding one of the factor values; and sixth instructions for outputting one or more results of the determining as a response to the request.

18. The system of claim 17, wherein the third instructions, upon execution, cause the one or more hardware processors to:

combine the root factors into a joint factor;

determine respective values of the joint factor for each record of the population of records;

wherein each of the values is shared by a respective subgroup of the population of records, the subgroup having a cardinality; and select, for each subgroup, a number of members of the sample of records from the subgroup, the number proportional to the cardinality of the subgroup.

19. The system of claim 17, wherein the fifth instructions, upon execution, cause the one or more hardware processors to determine the each score by:
- determining an F-beta score (Fb) for the corresponding factor value; and
- determining the each score proportional to a harmonic mean of Fb and FI: $1/(1/Fb+1/FI)$, wherein FI is the feature importance of the key factor associated with the corresponding factor value.

* * * * *